(12) United States Patent
Son

(10) Patent No.: US 7,805,478 B2
(45) Date of Patent: Sep. 28, 2010

(54) MONTGOMERY MODULAR MULTIPLIER

(75) Inventor: Hee-Kwan Son, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1611 days.

(21) Appl. No.: 11/068,371

(22) Filed: Mar. 1, 2005

(65) Prior Publication Data

US 2005/0198093 A1    Sep. 8, 2005

(30) Foreign Application Priority Data

Mar. 2, 2004    (KR) ..................... 10-2004-0013855

(51) Int. Cl.
*G06F 7/38* (2006.01)
*H04K 1/00* (2006.01)

(52) U.S. Cl. .................................... 708/491
(58) Field of Classification Search .................. 708/491
See application file for complete search history.

(56) References Cited

U.S. PATENT DOCUMENTS

| 6,356,636 | B1 | 3/2002 | Foster et al. | |
|---|---|---|---|---|
| 6,598,061 | B1 * | 7/2003 | Symes et al. | 708/491 |
| 7,480,691 | B2 * | 1/2009 | Okumura | 708/628 |
| 2002/0172355 | A1 | 11/2002 | Lu et al. | |

FOREIGN PATENT DOCUMENTS

| KR | 1998-083641 A | 12/1998 |
|---|---|---|
| WO | WO 88/05189 | 7/1988 |
| WO | WO 02/073450 A1 | 9/2002 |

OTHER PUBLICATIONS

French Search Report dated Feb. 2, 2007.
J-H Hong et al., "Cellular-array Modular Multiplier for fast RSA Public-key Cryptosystem Based on Modified Booth's Algorithm," IEEE Transactions on Very Large Scale Integration (VLSI) Systems, IEEE Service Center, Piscataway, NJ, US, vol. 11, No. 3, Jun. 2003, pp. 474-484, XP011099280.
Tenca A F et al., "High-radix Design of a Scalable Modular Multiplier," Cryptographic Hardware and Embedded System. 3rd International Workshop, CHES 2001, Paris, France, May 14-16, 2001 Proceedings, Lecture Notes in Computer Science, Berlin: Pringer, DE, vol. vol. 2162, May 14, 2001, pp. 185-201, XP001061165.

(Continued)

*Primary Examiner*—Chuong D Ngo
(74) *Attorney, Agent, or Firm*—Harness, Dickey & Pierce, P.L.C.

(57) ABSTRACT

In a Montgomery multiplier, a modulus product generator may select a modulus product from a plurality of selectable n-bit modulus numbers M, a given modulus number M being formed from a currently input extended chunk of bits among the n-bit modulus numbers. A partial product generator may select a multiplicand number from a plurality of selectable n-bit multiplicands A as a partial product, a given multiplicand A being formed from a currently input extended chunk of bits among the n-bit multiplicands. An accumulator may accumulate the selected modulus product and partial product to generate a multiplication result. The Montgomery multiplier may be part of an operation unit that may include a memory and host, and may be adapted to perform a Montgomery multiplication operation and a normal multiplication operation based on a logic state of a control signal input thereto.

59 Claims, 25 Drawing Sheets

OTHER PUBLICATIONS

Tenca A F et al., "An Efficient and Scalable Radix-4 Modular Multiplier Design using Recoding Techniques," Conference Recod of the 37$^{th}$ . Asilomar Conference on Signals, Systems, & Computers. Pacific Grove, CA Nov. 9-12, 2003. Asilomar Conference on Signals, Systems and Computers, New York, NY : IEEE, US, vol. vol. 1 of 2, Conf. 37, Nov. 9, 2003, pp. 1445-1450, XP010701352.

Hee-Kwan Son et al., "Design and Implementation of Scalable Low-Power Montgomery Multiplier," Computer Design: VLSI in Computers and Processors, 2004. ICCD 2004. Proceedings. IEEE International Conference in San Jose, CA, USA Oct. 11-13, 2004, Piscataway, NJ, USA, ICCC, Oct. 11, 2004, pp. 524-531, XP010736818.

Wang, P. A. et al: "New VLSI architectures of RSA public-key cryptosystem" Proceedings of 1997 IEE International Symposium on Circuits and Systems, Hong Kong Jun. 9-12, 1997, New York, NY, USA, IEE, US, vol. 3, Jun. 9, 1997, S. 2040-2043.

German Office Action dated Nov. 13, 2006.

German Office Action dated Sep. 10, 2009, for corresponding Application No. 10 2005 063 456.7-53.

* cited by examiner

Fig. 6

| FORCE_RI[2:0] | REG_DI[31:0] |
|---|---|
| 111 | {{15{SIGN_S}},MS1B_S,{16{SIGN_S}}} |
| 110 | {{16{SIGN_S}},{15{SIGN_S}},MS1B_S} |
| 101 | {32{SIGN_S}} |
| 100 | {32{SIGN_B}} |
| 011 | {32{SIGN_A}} |
| 010 | {RAM_DI[15:0],RAM_DI[31:16]} |
| 001 | {RAM_DI[31:16],RAM_DI[15:0]} |
| 000 | {32{1'b0}} |

Fig. 7

| SEL_RDO[1:0] | RAM_DO[31:0] |
|---|---|
| 11 | QO_SIPO_REG[31:0] |
| 10 | SO_SIPO_REG[31:0] |
| 01 | CPA_S_REG[31:0] |
| 00 | RAM_DO[31:0] |

Fig. 8A
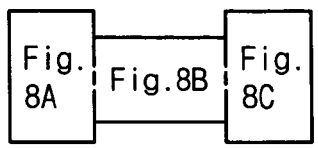
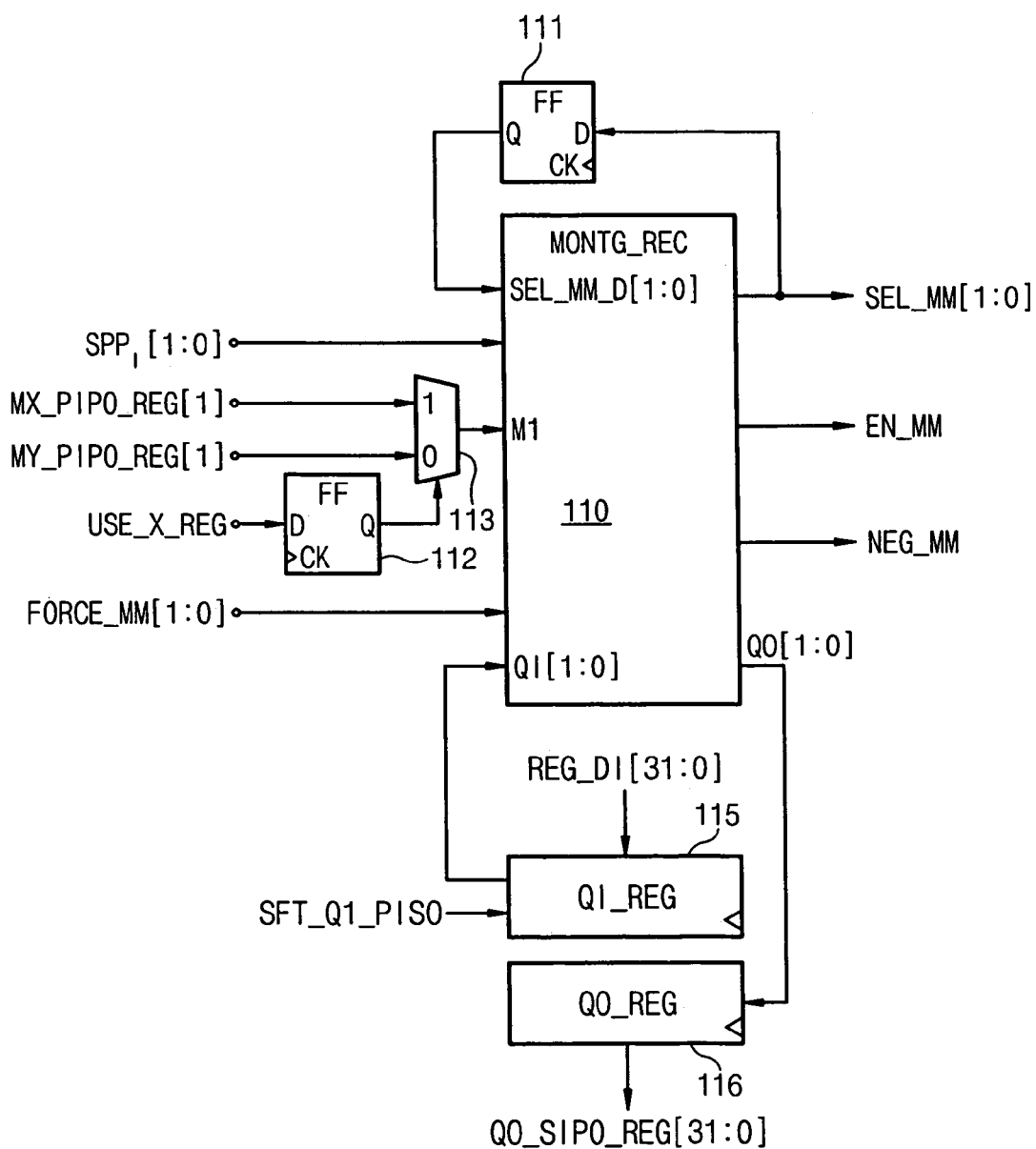

Fig. 11

| Montgomery Recoder(110) Input | | | Montgomery Recoder (110) Output | Selected $MM_i[273:0]$ |
|---|---|---|---|---|
| $SPP_i[1]$ | $SPP_i[0]$ | $M[1]$ | SEL_MM[1:0] | |
| 0 | 0 | 0 | 11 | 0 |
| 0 | 0 | 1 | 11 | 0 |
| 0 | 1 | 0 | 01 | $\underline{M}$ |
| 0 | 1 | 1 | 00 | M |
| 1 | 0 | 0 | 10 | 2M |
| 1 | 0 | 1 | 10 | 2M |
| 1 | 1 | 0 | 00 | M |
| 1 | 1 | 1 | 01 | $\underline{M}$ |

Fig. 14

| Booth Recoder(140) Input | | | Booth Recoder(140) Output | | Selected PP$_i$[273:0] |
|---|---|---|---|---|---|
| B1 | B0 | BR | SEL_PP[1:0] | EN_PP | |
| 0 | 0 | 0 | Don't care | 0 | 0 |
| 0 | 0 | 1 | 00 | 1 | A |
| 0 | 1 | 0 | 00 | 1 | A |
| 0 | 1 | 1 | 10 | 1 | 2A |
| 1 | 0 | 0 | 11 | 1 | 2A |
| 1 | 0 | 1 | 01 | 1 | A |
| 1 | 1 | 0 | 01 | 1 | A |
| 1 | 1 | 1 | Don't care | 0 | 0 |

Fig. 25

| FORCE_PP[1:0] | B1 | B0 | BR | {PP[1],PP[0]} | SEL_PP[1:0] | EN_PP | NEG_PP |
|---|---|---|---|---|---|---|---|
| 00 | x | x | x | {0,0} | SEL_PP_D[0] | 0 | 0 |
| 01 | x | x | x | {A[1],A[0]} | 00 | 1 | 0 |
| 10 | x | x | x | {A[1] xor A[0],A[0]} | 01 | 1 | 1 |
| 11 | 0 | 0 | 0 | {0,0} | SEL_PP_D[1:0] | 0 | 0 |
| 11 | 0 | 0 | 1 | {A[1],A[0]} | 00 | 1 | 0 |
| 11 | 0 | 1 | 0 | {A[1],A[0]} | 00 | 1 | 0 |
| 11 | 0 | 1 | 1 | {A[0],0} | 11 | 1 | 0 |
| 11 | 1 | 0 | 0 | {A[0],0} | 10 | 1 | 1 |
| 11 | 1 | 1 | 0 | {A[1] xor A[0],A[0]} | 01 | 1 | 1 |
| 11 | 1 | 1 | 1 | {A[1] xor A[0],A[0]} | 01 | 1 | 1 |
| 11 | 1 | 1 | 1 | {0,0} | SEL_PP_D[1:0] | 0 | 0 |

Fig. 26

| FORCE_MM [1:0] | SPP[1:0] | M1 | QI[1:0] | QO[1:0] | SEL_MM[1:0] | EN_MM | NEG_MM |
|---|---|---|---|---|---|---|---|
| 00 | xx | x | xx | xx | SEL_MM_D[1:0] | 0 | 0 |
| 01 | xx | x | 00 | xx | SEL_MM_D[1:0] | 0 | 0 |
| 01 | xx | x | 01 | xx | 00 | 1 | 0 |
| 01 | xx | x | 10 | xx | 01 | 1 | 1 |
| 01 | xx | x | 11 | xx | 11 | 1 | 0 |
| 10 | xx | x | xx | xx | 10 | 1 | 0 |
| 11 | 00 | 0 | xx | 00 | SEL_MM_D[1:0] | 0 | 0 |
| 11 | 00 | 1 | xx | 00 | SEL_MM_D[1:0] | 0 | 0 |
| 11 | 01 | 0 | xx | 10 | 01 | 1 | 1 |
| 11 | 01 | 1 | xx | 01 | 00 | 1 | 0 |
| 11 | 10 | 0 | xx | 11 | 11 | 1 | 0 |
| 11 | 10 | 1 | xx | 11 | 11 | 1 | 0 |
| 11 | 11 | 0 | xx | 01 | 00 | 1 | 0 |
| 11 | 11 | 1 | xx | 10 | 01 | 1 | 1 |

MONTGOMERY MODULAR MULTIPLIER

CROSS-REFERENCE TO RELATED APPLICATIONS

This application claims priority under 35 U.S.C. §119 to Korean Patent Application No. 2004-13855, filed on Mar. 2, 2004 in the Korean Intellectual Property Office (KIPO), the contents of which are herein incorporated by reference in its entirety.

BACKGROUND OF THE INVENTION

1. Field of the Invention

The present invention relates generally to the field of cryptosystems, more particularly to a Montgomery modular multiplier for such cryptosystems.

2. Description of the Related Art

In information communication environments exchanging various data by way of computer networks, wired and/or mobile (wireless) communication fields, cryptographic systems (cryptosystems) are increasingly regarded as necessary facilities for assuring data security. Especially, it is necessary for an electronic accounting or identification system to be equipped with data security by employing encryption and/or decryption technologies. Cryptographic technologies may be briefly classified into the forms of a secret key (symmetric key, private key, or common key) and a public key (asymmetric key).

The Data Encryption System (DES) cryptographic algorithm proposed by the Department of Commerce of U.S.A. is one typical secret key type of cryptosystem. Other typical cryptosystems include the Government Standard (GOST) of ex-U.S.S.R, and the Internal Data Encryption Algorithm (IDEA) of Switzerland. For a secret key cryptosystem, it is advantageous to have an additional channel for security, since the partners exchanging information have to share the same secret key. Such secret key-type cryptosystems thus typically require maintenance and management of many secret keys by one user, in order for the user to communicate information with many other users.

A public key type of cryptosystem uses cryptographic and decryption keys different from each other, which may make it difficult to detect a corresponding key by the user, even though the person knows one of the two keys. In the public cryptosystem, information is scrambled or descrambled by means of a secret key and/or a public key (i.e., information may be scrambled using a private key and descrambled using a public key, and vice versa). While the public cryptosystem may be convenient in key management, because there is no need of an additional channel for sharing keys, and may provide improved data security as compared to a secret cryptosystem, a public cryptosystem is regarded as having a limited capacity to process high speed data, since two different keys must be generated, and because complex mathematical operations need to be performed for restoring information using the two different keys.

An advanced cryptographic system employs a Montgomery algorithm, which may be more advantageous for implementing a public key cryptographic algorithm in both hardware and software system embodiments. A cryptosystem using a Montgomery algorithm is able to transform a modular operation for a number, that is difficult to implement by hardware, into a shift operation of simplified multiplication and addition. The Montgomery algorithm uses an operand transformation process before and after a single multiplication operating step. Therefore, although a Montgomery-based cryptosystem may be slower than other modular multiplication systems in a single multiplication field, for applications running iterant multiplying operations, a Montgomery-based cryptosystem is able to process cryptographic operations faster than conventional public key based cryptographic algorithms because there is no need of an operand transformation step every processing cycle.

One of methods for enhancing processing speed for multiplication is to extend the number of radixes. If a radix value increases, the iterant number of accumulations in a given multiplication process decreases by a corresponding amount. However, increase of the radix number may cause a more complicated accumulation cycle due to additional processing steps, thus lengthening the processing time. For example, while it is relatively straightforward for a radix-2 operation algorithm to be implemented by hardware, the iterant number of accumulation cycles is double that of a radix-4 operation algorithm. Conversely, the radix-4 operation algorithm requires longer processing time for each iterant cycle and requires a more complex hardware architecture, relative to the hardware requirements for the radix-2 operation algorithm.

SUMMARY OF THE INVENTION

An exemplary embodiment of the present invention is directed to a Montgomery multiplier. The multiplier may include a modulus product generator selecting one of n-bit modulus numbers $-M$, $0$, $M$, $2M$ and a previous row result SI as a modulus product, and a partial product generator selecting a multiplicand number from one of $-2A$, $-A$, $0$, $+A$ and $+2A$ multiplicand numbers as a partial product. An accumulator of the multiplier may be configured to stack the selected modulus product and partial product therein. In an example, a Montgomery operation unit may include a memory, a host storing a multiplicand A, a multiplier B and a modulus number M in the memory, and the aforementioned Montgomery multiplier. The Montgomery multiplier may perform a Montgomery multiplying operation with the stored multiplicand, multiplier and modulus number under control of the host, and may store an operation result from the Montgomery multiplying operation in the memory.

Another exemplary embodiment of the present invention is directed to an accumulator. The accumulator may include a plurality of compressors for operating in a carry save adding mode, each of the plurality of compressors receiving a modulus product, a partial product, a first value and a second value, and generating a corresponding next sum, a corresponding next carry and a corresponding next lower value. The accumulator may include a sum register for receiving the corresponding next sum from each of the plurality of compressors to output a corresponding updated current sum, a carry register for receiving the corresponding next carry from each of the plurality of compressors to output a corresponding updated current carry, and a lower value register for receiving the corresponding next lower value from each of the plurality of compressors to output a corresponding updated current lower value.

Another exemplary embodiment of the present invention is directed to an operation unit. The operation unit may include a multiplier sequentially performing unit multiplying operations $(n/c)*(n/c)$ times for an n-bit multiplicand number composed of $n/c$ chunks of bits, an n-bit multiplier number composed of $n/c$ chunks, an n-bit modulus number composed of $n/c$ chunks, extended chunks of the multiplier number and extended chunks of the modulus number. For the operation unit, $n>c$ and n and c are positive integers.

Another exemplary embodiment of the present invention is directed to a Montgomery multiplying unit. The multiplying unit may include an operation matrix having n/c number of rows, n and c being positive integers, wherein each row is associated with unit multiplying operations iteratively performed n/c times and a carry propagation adding operation. The multiplying unit may include an accumulator having a carry save adding structure for performing the iterative unit multiplying operations, and an additional carry propagation adder for performing the carry propagation adding operation.

Another exemplary embodiment of the present invention is directed to a Montgomery multiplier. The Montgomery multiplier may include a modulus product generator selecting a modulus product from a plurality of selectable n-bit modulus numbers M, a given modulus number M being formed from a currently input extended chunk of bits among the n-bit modulus numbers. The multiplier may include a partial product generator selecting a multiplicand number from a plurality of selectable n-bit multiplicands A as a partial product, a given multiplicand A being formed from a currently input extended chunk of bits among the n-bit multiplicands. An accumulator of the multiplier may accumulate the selected modulus product and partial product to generate a multiplication result. In an example, the aforementioned Montgomery multiplier may be part of an operation unit that may include a memory and host.

Another exemplary embodiment of the present invention is directed to a Montgomery multiplier. The Montgomery multiplier may be adapted to perform a Montgomery multiplication operation and a normal multiplication operation based on a logic state of a control signal input thereto.

BRIEF DESCRIPTION OF THE DRAWINGS

The present invention will become more apparent by describing, in detail, exemplary embodiments thereof with reference to the attached drawings, wherein like elements are represented by like reference numerals, which are given by way of illustration only and thus do not limit the exemplary embodiments of the present invention.

FIG. 6 is a truth table to illustrate the signals selected by a multiplexer 12_1 in memory interface 12 in accordance with a control signal FORCE_RI[2:0].

FIG. 7 is a truth table to illustrate the signals selected by the multiplexer 12_3 in memory interface 12 in accordance with a control signal SEL_RDO[1:0].

FIGS. 8A to 8C are block diagrams illustrating a functional structure of the Montgomery multiplier 10 in accordance with an exemplary embodiment of the present invention.

FIG. 11 is a truth table to illustrate an arrangement of codes by a Montgomery recoder 110 in accordance with an exemplary embodiment of the present invention.

FIG. 14 is a truth table to illustrate an arrangement of codes by a Booth recoder 140 in accordance with an exemplary embodiment of the present invention.

FIG. 25 is a truth table to illustrate an arrangement of logical formulas for given input/output signals of the Booth recoder 140.

FIG. 26 is a truth table to illustrate an arrangement of logical formulas for given input/output signals of the Montgomery recoder 110.

DETAILED DESCRIPTION OF THE EXEMPLARY EMBODIMENTS OF THE PRESENT INVENTION

Figure 1:
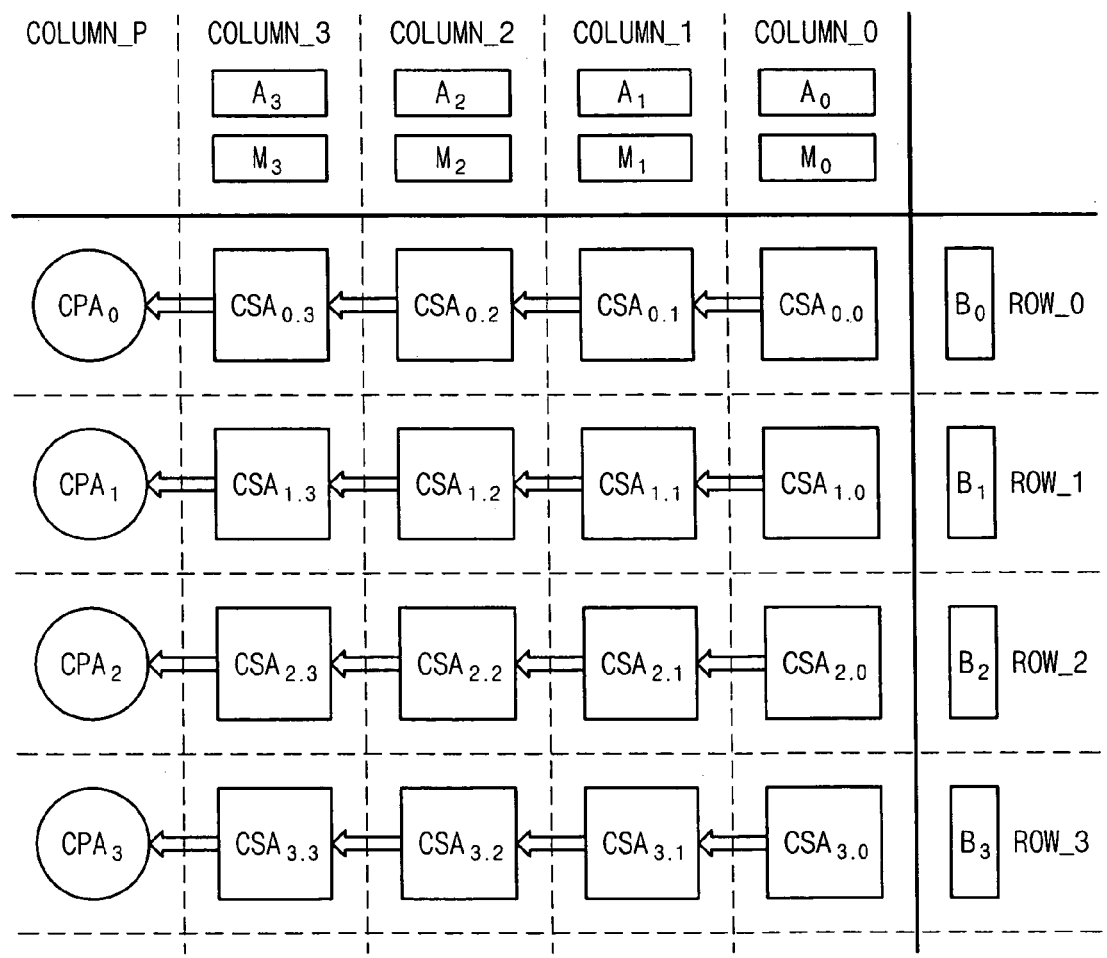
FIG. 1 is a schematic diagram illustrating a structure of an operation matrix for carrying out a quadruple precision operation.

Exemplary embodiments of the present invention will be described below in more detail with reference to the accompanying drawings. The present invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art.

Like numerals refer to like elements throughout the specification.

In light of the problems discussed with conventional cryptosystems, it may be desirable to design a cryptosystem architecture that is capable of enhancing processing speed for a modular operation, without having to enlarge or complicate system hardware. On the other hand, with the improved operational facility provided by computer systems, it may be necessary to lengthen a cryptographic key in order to assure the security of a cryptosystem. The length of a given cryptographic key may be desirably variable in accordance with the given application. Thus, a cryptosystem which may be adaptable to various application environments with variable lengths of given cryptographic keys may be desired.

As will be described in further detail below, the exemplary embodiments of the present invention introduce a scalable Montgomery modular multiplier supporting a multiplicity of precision. The exemplary embodiments of the present invention may enable a multiplying operation with a multiplicity of precision using a less-complex Montgomery multiplier. In addition, the exemplary multiplier may perform a normal multiplying operation, as well as the Montgomery multiplication based on a suitable control signal.

The exemplary embodiments of the present invention may be applicable to a Montgomery multiplication algorithm based on a radix-4 operational logic, hereinafter called "radix-4 interleaved Montgomery multiplication algorithm" (R4IMM). In accordance with the exemplary embodiments described hereafter, the proposed logical operation system of the multiplier may be applicable to computing systems or communication networks employing public key-type cryptographic algorithms, and may be embodied in portable integrated circuit (IC) cards (or smart cards), etc.

In accordance with the exemplary embodiments, parameters referred to in the R4IMM algorithm may be defined as follows:

M represents a modulus value and is a positive, odd integer greater than 2, i.e., 3, 7, etc.;

M' is an integer that satisfies an equational condition $(-M*M') \bmod 4 = 1$;

A represents a multiplicand value and is an integer which satisfies a condition $0 \leq A < M$;

B denotes a multiplier value and is an integer which satisfies a condition, $0 \leq B < M$.

Here, $$B = \sum_{I=0}^{N-1} b_I A^I, b_I \in \{0, 1, 2, 3\},$$

where $b_I$ is a unit multiplicand that is composed of 2 bits;

o is a parameter that represents an operand, and denotes a given length of the multiplicand, multiplier, and modulus;

c is a parameter that represents a 'chunk length' (i.e., chunk of bits or bytes, etc.) when a unit multiplying operation is being performed, and represents a width of a data path that is present in system hardware;

w is a parameter that represents a word length (i.e., a data bus width in a memory); and d is a parameter and represents a digit length of a radix. For example, if a cryptosystem employing a radix-4 multiplier has a 32-bit data bus width, the word length w is 32 while the digit length d is 2 in a radix-4 multiplier.

A basic R4IMM algorithm applicable to the exemplary embodiments of the present invention may be described as follows.

```
S₀ := 0
for I := 0 to (n/2 − 1)
    q_I := (((S_I + b_I A) mod 4) * M') mod 4
    S_{I+1} := (S_I + b_I A + q_I M)/4
endfor
    if (S_N ≥ M) S_N := S_N − M
```

In the basic R4IMM algorithm above, the parameter I denotes a digit index or the number of iterant operations. The quotient $q_I$ means the number of M to be added for establishing the two least significant bits (LSBs) of $S_I + b_I + q_I M$ to "00". In a residue number system (RNS), in which a number obtained by adding an integer-multiple of the modulus M to a certain number is the same as its original number, the modulus product $q_I M$ (an integer-multiple of the modulus value M) is equal to the original number. In addition, even when the two LSBs "00" of the set $S_I + b_I + q_I M$ are divided by a the radix value 4 (i.e., shifted to the right by two (2) bits), the information is not lost because its most significant numbers (i.e., MSBs) are maintained.

A partial product value $PP_I$ and a modulus product value $MM_I$ are obtained to implement the R4IMM algorithm on a hardware system. Since the unit multiplicand $b_I$ and the quotient $q_I$ are each two bits, the partial product $PP_I$ and the modulus product $MM_I$ may be generated using four available values as shown in Equation 1 (here, $b_I \in \{0, 1, 2, 4\}$ and $q_I \in \{0, 1, 2, 3\}$).

$$b_I A = PP_I \in \{0, A, 2A, 3A\}$$

$$q_I A = MM_I \in \{0, M, 2M, 3M\} \quad \text{[Equation 1]}$$

However, if the partial product $PP_I$ and the modulus product $MM_I$ are established as Equation 1, an operation for obtaining a sum of a 1-bit shifted value of A or M and its original value (i.e., A or M) is to be performed in order to calculate 3A or 3M. In an example, an independent adder may be used to calculate the 3A or 3M values, or the 3A or 3M values may be calculated in advance and stored for later referral thereto. But, the calculation of 3A and 3M may burden conventional hardware architecture and may serve as a source of degraded operational performance, since the system has to be designed with regard to the time and space needed for calculating the 3A and 3M values therein.

Accordingly, the exemplary embodiments of the present invention may be configured so as to reduce the hardware burden while enhancing computational performance in generating the partial product value $PP_I$ and the modulus product values $MM_I$. This reduction in hardware burden with enhanced processing may be possible by using two distinct types of recording arrangements and/or recording methodologies.

In addition, the multiplier in accordance with the exemplary embodiments of the present invention may perform a c-bit multiplying operation in a given time, and may be capable of processing an n-bit multiplying operation (where n is integer-multiple of c) using iterant operation cycles. A multi-precision R4IMM algorithm may thus be configured as follows.

```
for row_idx = 0 to row_idx = (n/c – 1)
begin
    for col_idx = 0 to col_idx = (o/c – 1)
    begin
        do_ini( );
        for wrd_idx = 0 to wrd_idx = (c/w – 1)
        begin
            for dgt_idx = 0 to dgt_idx = (w/d – 1)
            begin
                do_acc( );
            endfor
        endfor
    endfor
    for wrd_idx = 0 to wrd_idx = (c/w – 1)
    begin
        do-cpa( );
    endfor
endfor
```

In the algorithm, the function do_ini( ) denotes a function to accumulate a chunk (chunk of bits or bytes of a word), which is positioned at the same location with a current column and on a current value in the accumulator, from the operation result S determined in the previous row. In other words, the function do_ini( ) modifies an initial value of an accumulator of the multiplier at the beginning of a given column loop. This modification procedure is done because the Montgomery multiplier in accordance with the exemplary embodiments of the present invention is designed to be adaptable to a given operation with multi-precision.

The function do_acc( ) denotes a function of accumulating two vectors of the partial product PP and the modulus product MM, which are generated every cycle, in the accumulator. As the accumulator employed in the exemplary embodiments of the present invention may be embodied in the architecture of one or more carry saving adders (CSA), a resultant value from the addition may be divisionally represented into each of a carry vector, a sum vector, and a lower value vector, each of which are stored in a corresponding register assigned to the given vector.

The function do_cpa( ) denotes an adding operation with a carry value, a sum value, and a lower value. This may be implemented using a carry propagation adder, in which the values are obtained as an accumulated result at the last step of each row.

FIG. 1 is a schematic diagram illustrating a structure of an operation matrix for carrying out a quadruple precision operation. Referring to FIG. 1, for a quadruple precision operation, the multiplicand A, multiplier B, and modulus M are each divided into four chunks, each represented as $A=\{A_3A_2A_1A_0\}$, $B=\{B_3B_2B_1B_0\}$, and $M=\{M_3M_2M_1M_0\}$. In a multiplier with a c-bit length of a chunk, a multiplying operation may be sequentially carried out in a unit of the chunk, such as $A_0*B_0, A_1*B_0, A_2*B_0, A_3*B_0$, etc., with a final result of the multiplying operation being stored.

Figure 2:
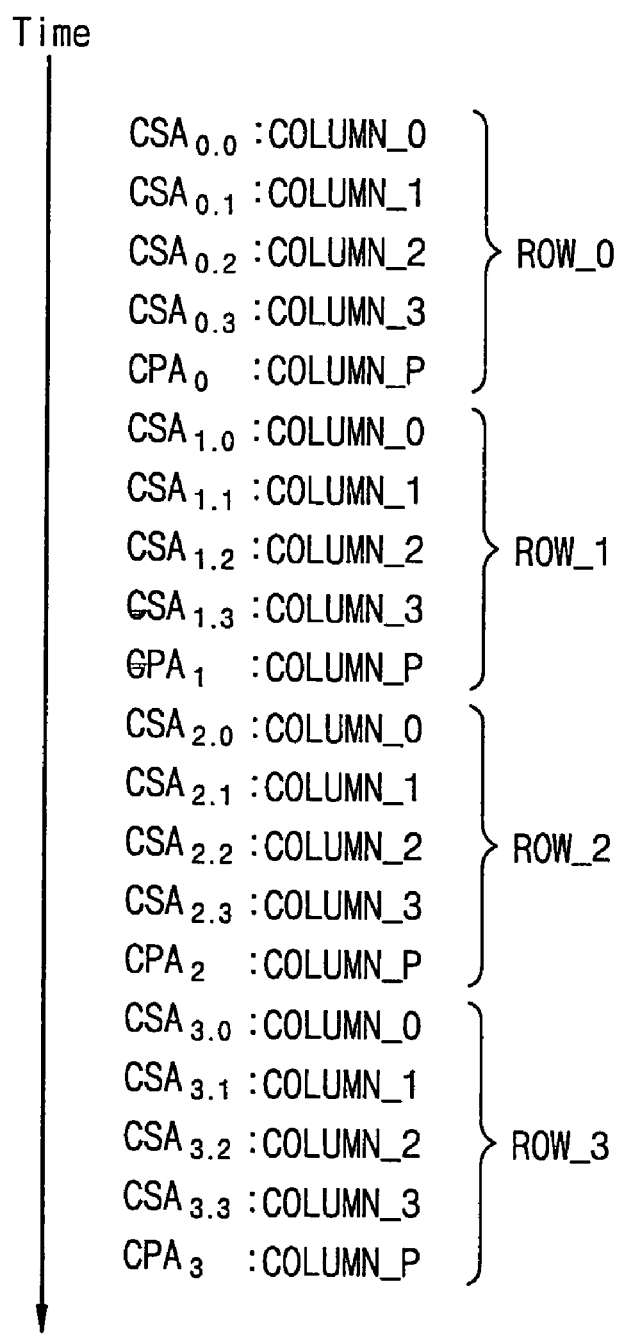
FIG. 2 illustrates a sequence of a unit multiplying operation with the quadruple precision shown in FIG. 1.

FIG. 2 illustrates a sequence of a unit multiplying operation with the quadruple precision shown in FIG. 1. In accordance with the exemplary embodiments of the present invention, the parameters A3, A2, A1, A0, B3, B2, B1, and B0 may represent chunk lengths, and the operation sets $A_0*B_0, A_1*B_0, A_2*B_0, A_3*B_0$, etc. may be referred to as unit multiplying operations (or boxes). Each of operations for the multiplicand A and the multiplier B may be carried out by an accumulator of a carry save adding (CSA) loop, and may include a carry propagation adding (CPA) loop for summing three resultant values (a carry, a sum, and a lower value) in the accumulator to generate a single value after completing the final unit multiplying operation of each row. FIG. 2 thus illustrates the sequence of unit multiplying operations with the quadruple precision shown in FIG. 1.

Figure 3:
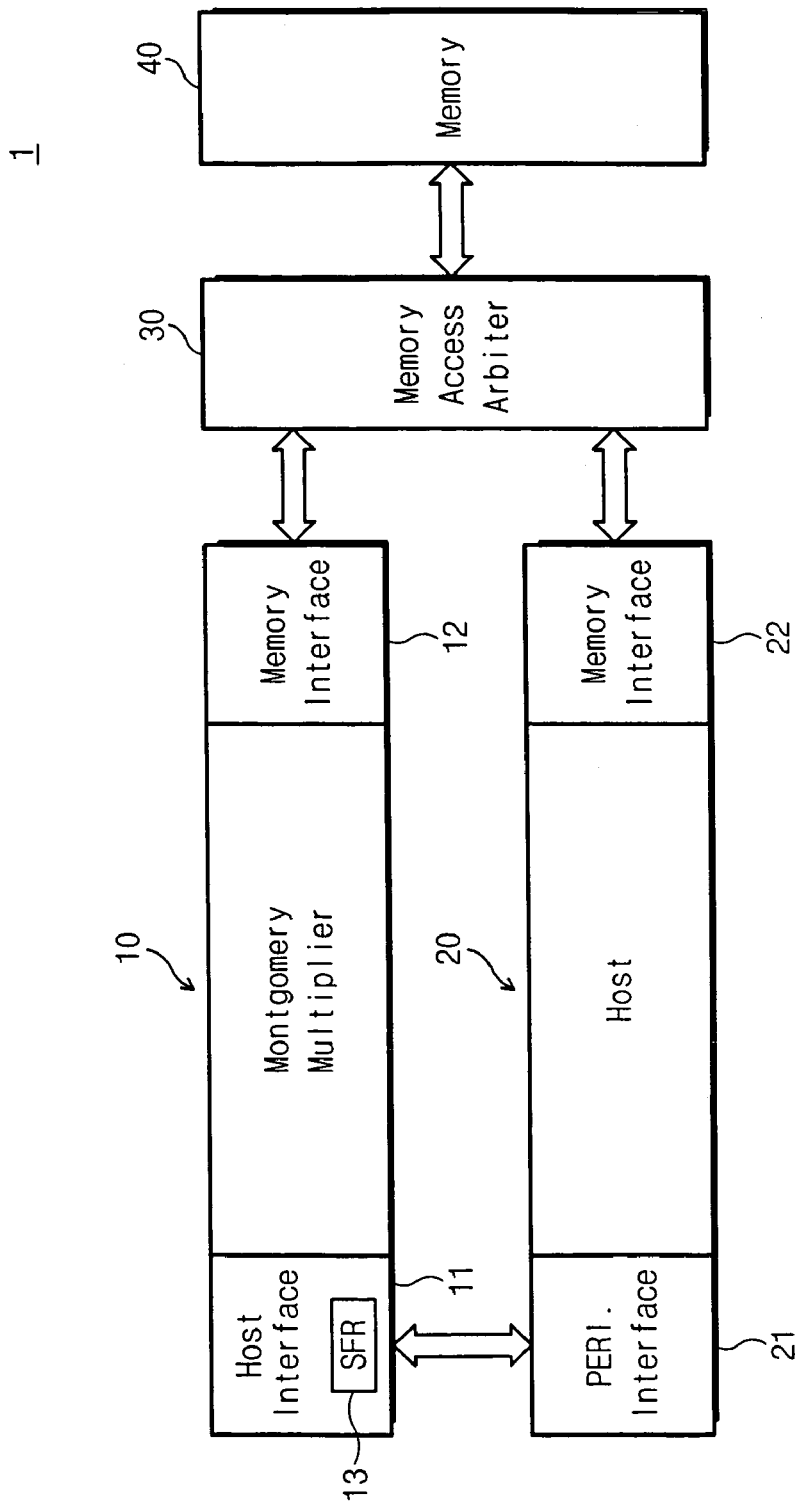
FIG. 3 is a schematic diagram of a cryptographic system in accordance with an exemplary embodiment of the present invention.

FIG. 3 is a schematic diagram of a cryptographic system in accordance with an exemplary embodiment of the present invention. Referring to FIG. 3, the cryptosystem 1 may include a Montgomery multiplier 10, a host 20, a memory access arbiter 30, and a memory 40. The host 20 may include a peripheral interface 21 for communications with peripheral devices such as the Montgomery multiplier 10 and input/output units, and a memory interface for communication with the memory 40.

The multiplier 10 may include a host interface 11 to communicate with the host 20, and a memory interface 12 to communicate with the memory 40. Communication conditions between the multiplier 10, host 20 and memory 40 may be regulated by memory access arbiter 30, for example. The host interface 11 may include a special function register (SFR) 13. The multiplier 10 may also include a controller (not shown) to generate certain control signals referred to in more detail hereafter as FORCE_RI[2:0], SEL_RDO[1:0], FORCE_PP[1:0], FORCE_MM[1:0], USE_X_REG, SEL_CPA_IN[2:0], IS_1ST_CPA_WORD, IS_ODD_PREC, UDP_SIGN_S, UPD_MS1B_S, SFT_BI_PISO, SFT_QI_PISO, STO_BR_ROW and SHFT_ACC.

The host 20 stores the operands (i.e., multiplicand A, multiplier B, modulus M) in the memory 40, and instructs the execution of a recording operation mode by sending an operation start command to SFR 13. The multiplier 10 informs the host 20 of an operation end by recording the operation end information in the SFR 13, after storing the resultant value S of a given operation in a field of the memory 40. The field in which the resultant value S is stored may be designated by the host 20. The SFR 13 may also store a sign bit to be described in more detail below.

The memory 40 may be divided into segments which are sized into a given storage capacity. The segment storing input and resultant values may be designated by the host 20, with an index assigned to each segment. Therefore, if a result obtained after one cycle of a multiplying operation is reapplied to the next multiplying operation as an input value (that is an exponential operation used in a public-key cryptographic system such as RSA), is may be possible to perform the next multiplying operation after changing only an index of the segment for input and output values, i.e., without any migration of data. This may be advantageous to improving system performance.

Figure 4:
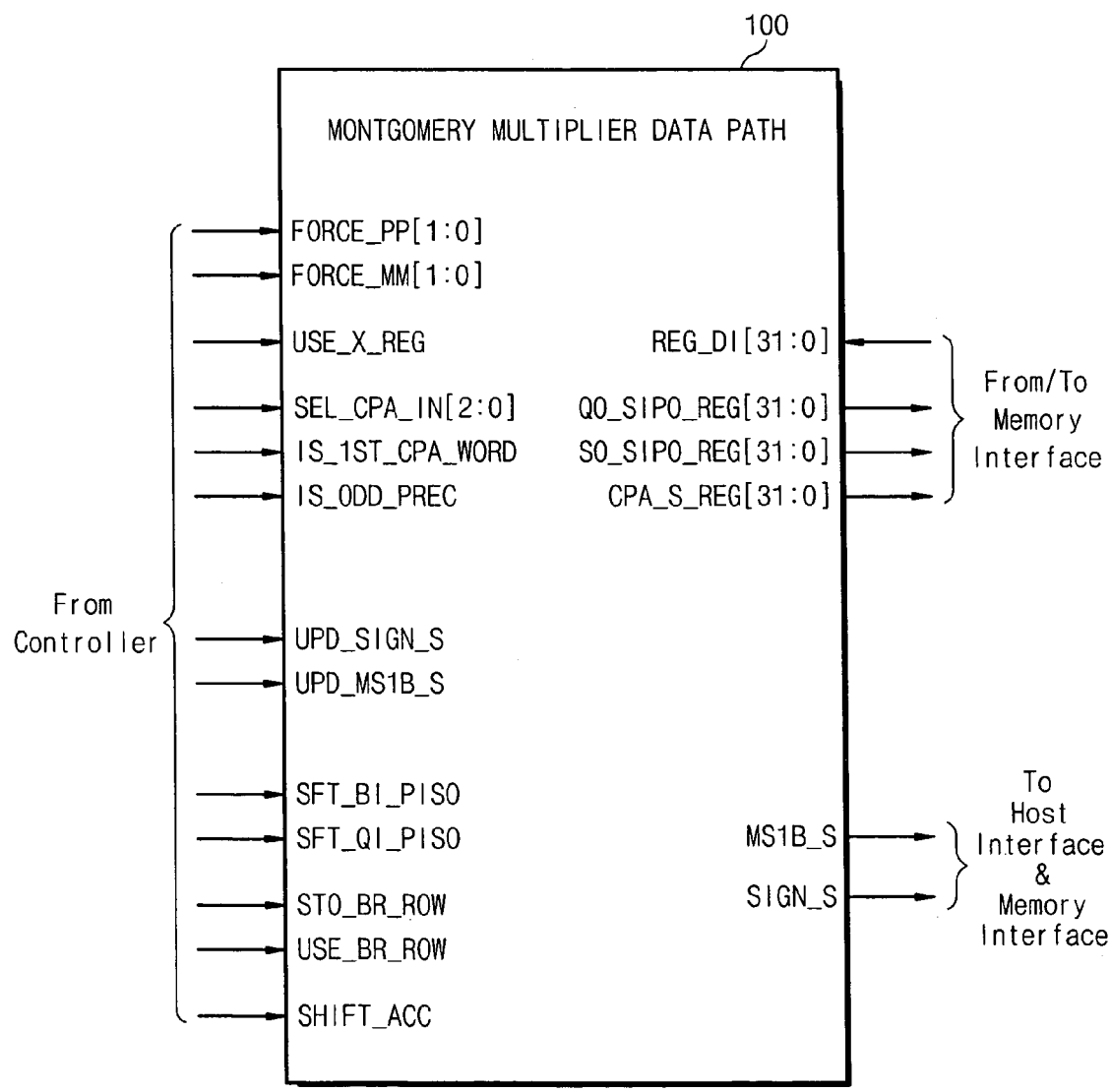
FIG. 4 is a block diagram of a Montgomery multiplier data path according to an exemplary embodiment of the present invention.

FIG. 4 is a block diagram of a Montgomery multiplier according to an exemplary embodiment of the present invention. FIG. 4 illustrates an arrangement of data input to and output from the Montgomery multiplier 10.

Figure 5:
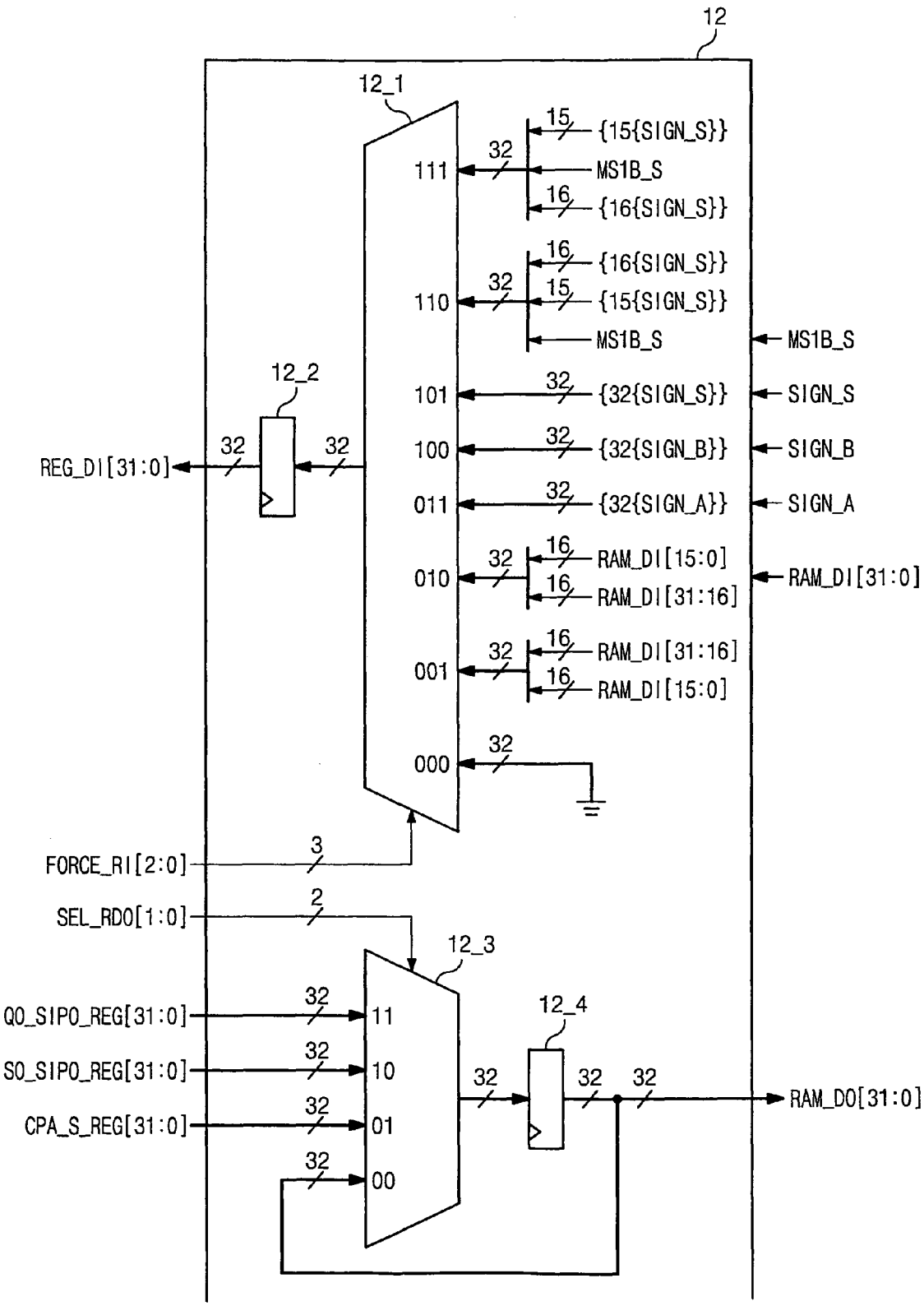
FIG. 5 is a block diagram illustrating the memory interface 12 of the Montgomery multiplier shown in FIG. 3.

FIG. 5 is a block diagram illustrating the memory interface 12 of the Montgomery multiplier shown in FIG. 3. The memory interface 12 includes multiplexers 12_1 and 12_3, and registers 12_2 and 12_4.

FIG. 6 is a truth table to illustrate the signals selected by a multiplexer 12_1 in memory interface 12 in accordance with a control signal FORCE_RI[2:0], and FIG. 7 is a truth table to illustrate the signals selected by the multiplexer 12_3 in memory interface 12 in accordance with a control signal SEL_RDO[1:0]. The multiplexer 12_1 outputs one of the input signals in response to the control signal FORCE_RI[2:0]. As shown in FIG. 6, a data signal REG_DI[31:0] output from the multiplexer 12_1 and the register 12_2 may be supplied to the Montgomery multiplier data path 100, as will be described in further detail below. The multiplexer 12_3 outputs one of its input signals in response to a state of the control signal SEL—RDO[1:0]. As shown in FIG. 4, a data signal RAM_DO[31:0] output from the multiplexer 12_3 and the register 12_4 may be stored in memory 40.

Figure 8B:
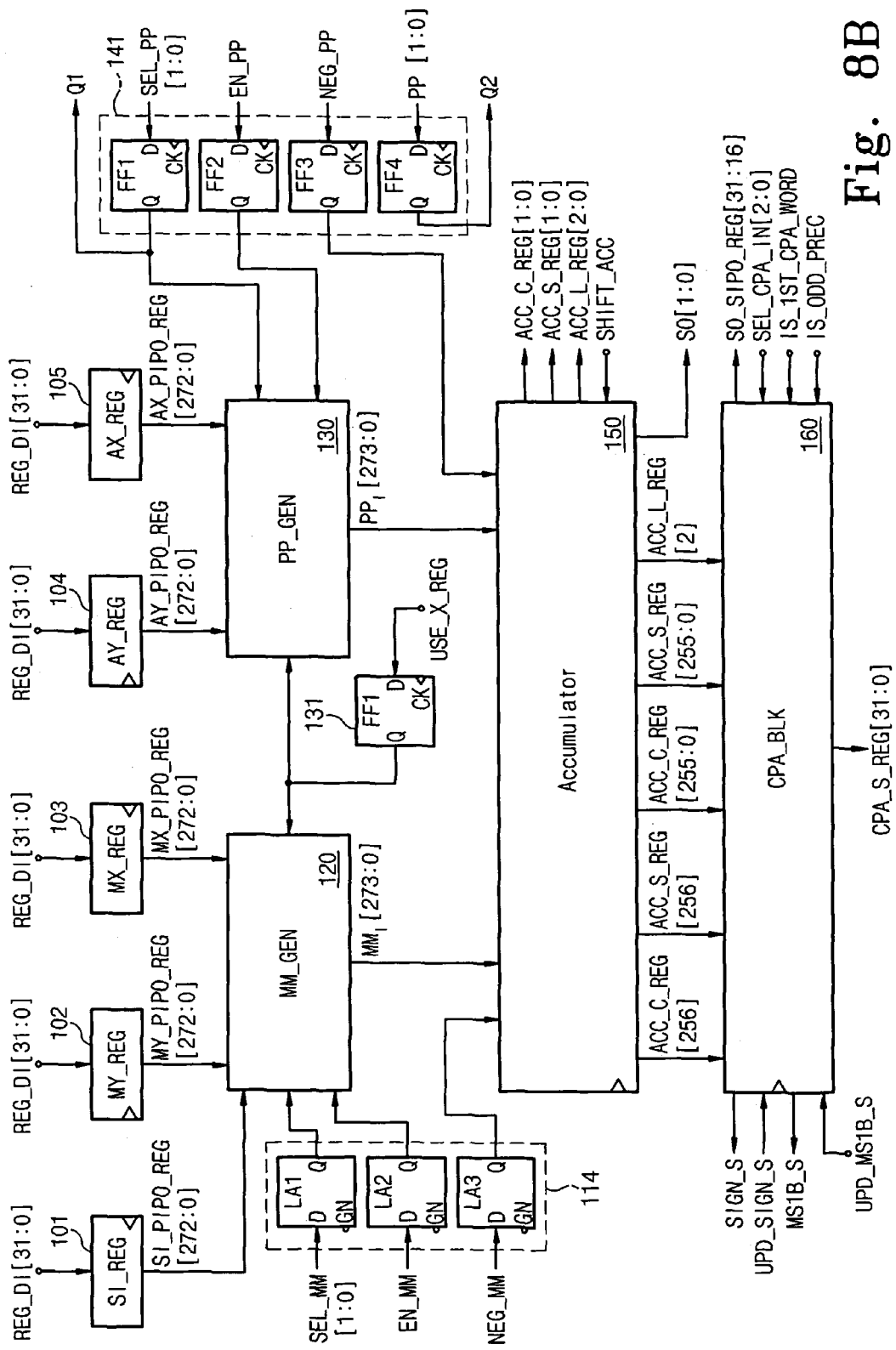
Figure 8C:
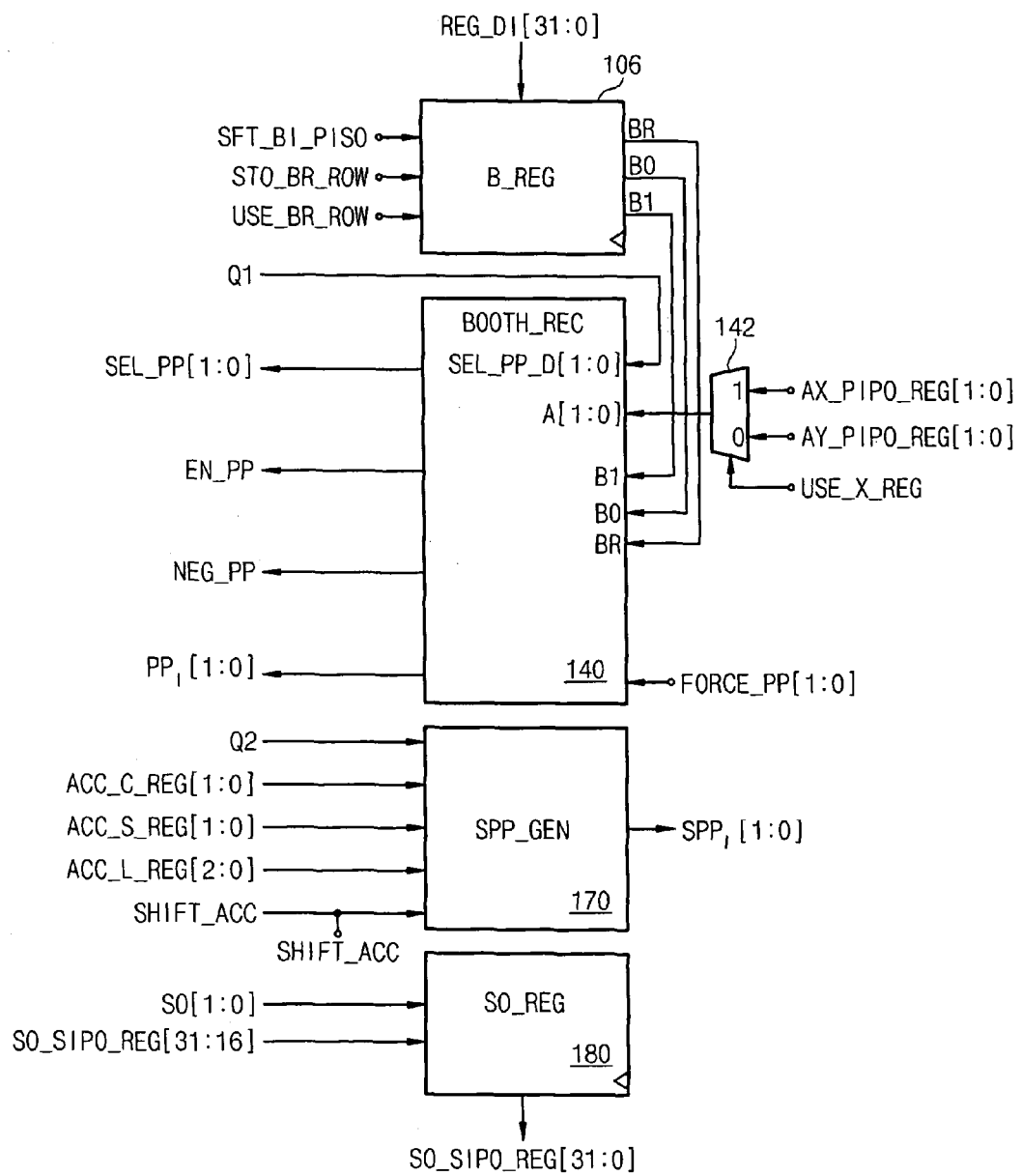

FIGS. 8A to 8C are block diagrams illustrating a functional structure of the Montgomery multiplier in accordance with an exemplary embodiment of the present invention. The Montgomery multiplier shown in FIGS. 8A to 8C may include modulus registers 102 and 103 for storing the modulus M, multiplicand registers 104 and 105 for storing the multiplicand A, a multiplier register 106 storing the multiplier B, a prior value register 101 storing a resultant value of the previous row (SI), a Montgomery recoder 110, a Booth recoder 140, a multiple modulus generator 120 for generating a modulus product MM, a partial product generator 130 for generating a partial product PP, an accumulator 150 for performing a Montgomery multiplying operation, and a CPA block 160 for summing three resultant values (a carry, a sum, and a lower value) in the accumulator 150.

The length of each operand stored in the registers 101~105 may be (c+w/2)+1. Each register may be composed of a parallel-in parallel-out (PIPO) register and may be controllable with division of an 1-bit flipflop and 2*(c/w)+1 sub-registers. The length of the sub-registers may be w/2.

Figure 9:
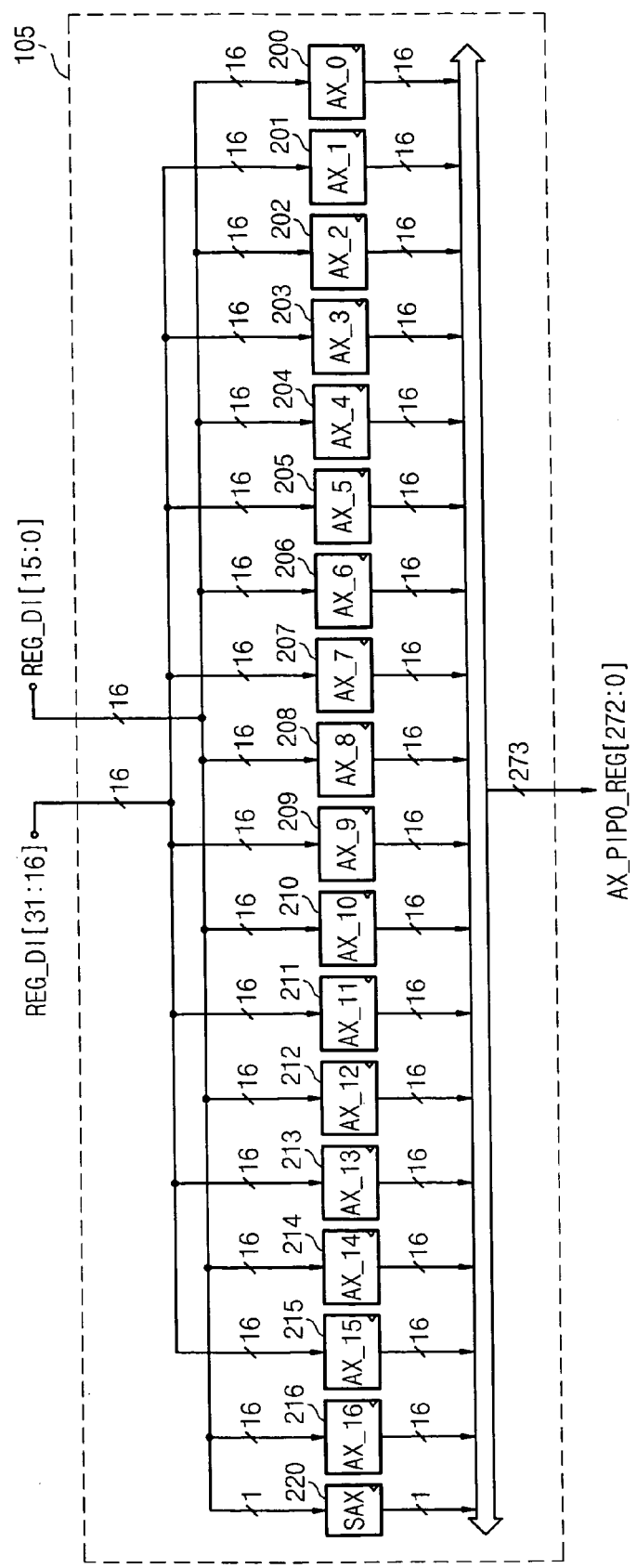
FIG. 9 illustrates a detailed circuit configuration of an exemplary register 105 storing a multiplicand value A in accordance with an exemplary embodiment of the present invention.

FIG. 9 illustrates a detailed circuit configuration of an exemplary register 105 storing a multiplicand value A in accordance with an exemplary embodiment of the present invention. The structure of register 105 is an example; each of registers 101~105 may be formed of the same architecture. Referring to FIG. 9, register 105 may be configured with the condition of c=256 and w=32, and may include 17 sub-registers 200~216 and a sign register 220. Although 17 sub-registers are shown, a given register may be configured to include fewer or greater than 17 sub-registers, for example; the number may be application-dependent.

When c=256 and w=32, the size of each of the sub-registers 200~216 may be 16 bits (representing a half-word) and the size of the sign register 220 may be one bit. The even-numbered sub-registers, 200, 202, 204, . . . , and 216 may receives a lower 16 bits REG_DI[15:0] of data (a 32-bit word) supplied from the memory interface 12, while the odd-numbered sub-registers, 201, 203, 205, . . . , and 215 may receive the higher 16 bits REG_DI[31:16] of the 32-bit data supplied from memory interface 12.

In its original form, the bit length n of the operand is an integer multiple of the chunk bit length c, thus a sign bit is added to the operand because the Booth and Montgomery recoding functions are provided thereto. Therefore, the bit length (c') of the each operand used in the Montgomery multiplier data path 100 becomes c'=c+k, where the minimum value of k is 1. The parameter c' may be referred to as an 'extended chunk bit length' and is a parameter that represents the bit length of an extended chunk. Practically, as input data is read out from the memory 40 and the data bus width w=32 renders a word, a half-word, and a quarter-word to be 32, 16, and 8 bits, respectively, as data transmission rates, the available values of k are w, w/2, and w/4 with respect to the data transmission rates. A smaller value of k reduces the number of iteration cycles for the unit multiplying operation (the CSA operation in FIG. 1) and thus reduces the size of the corresponding hardware implementing the iteration cycles. This may be advantageous for realizing greater computational performance, with reduced circuit size and/or power consumption, etc.

Accordingly, a simplified hardware architecture may be realized when k=w/2 rather than k=w, and if k=w/4 as compared to k=w/2. The available values for k may thus be one of w, w/2 and w/4. In an example, the exemplary embodiments of the present invention employ a k value of k=w/2. Thus, in this example, with a chunk bit length c=256, a word length w=32, and a k=32/2=16, the extended chunk bit length c' may be determined as c'=272 bits (since c'=c+k and k=w/2, c'=256+16=272). The sign bit SIGN_S that is stored in the SFR 13 may be stored in the sign register 220 via memory interface 12.

Each sub-register carries out a selective data loading operation in response to a gated-clock or load-enable control signal. Accordingly, a multiplicand AX_PIPO_REG[272:0] output from the register 105 is composed of 273 bits (the extended chunk bit length of 272 bits and the 1-bit SIGN_S bit). The structures of the registers 101-104 are the same as register 105. As shown in FIG. 8B, the data supplied to the registers 101-105 is REG_DI[31:0]. As shown in FIG. 5, for example, the data REG_DI[31:0] may be generated by combining word length data RAM_DI[31:0] supplied to memory interface 12 from the memory 40, the sign bits SIGN_A, SIGN_B, and SIGN_S, and the second higher bit MS1B_S of the previous resultant value. As shown in the truth table of FIG. 6, the control signal FORCE_RI[2:0] determines when and how the combination is generated for setting the data REG_DI[31:0].

The prior value register 101 may be used for supply a resultant value of the previous row, SI, for calculation with a current row. In FIG. 8B, this is shown as SI_PIPO_REG[272:0].

Two modulus registers 102 and 103 are used for supplying modulus values M (see FIG. 8B, MY_PIPO_REG[272:0] and MX_PIPO_REG[272:0]) to the multiple modulus generator 120, and two multiplicand registers 104 and 105 are used for supplying multiplicand values A to the partial product generator 130 (FIG. 8B, AY_PIPO_REG[272:0] and AX_PIPO_REG[272:0]). The reason for using two registers each for storing the multiplicand value(s) A and the modulus value(s) M is to enhance processing speeds for processing A and M. For example, in the two registers 104 and 105 for the multiplicand A, one register (104 or 105) stores a multiplicand value A to be used for a current unit multiplying operation in the Montgomery multiplier data path 100, while the other stores a multiplicand value A to be used for the next unit multiplying operation. Similarly, in the two registers 102 and 103 for the modulus M, one register (102 or 103) stores a modulus value M to be used for a current unit multiplying operation in the Montgomery multiplier 10, while the other register stores a modulus value M to be used for the next unit multiplying operation. Therefore, it is possible to start the next unit multiplying operation without any delay to read the multiplicand and modulus values from the memory, after completing a current unit multiplying operation.

The multiplier 10 obtains a Montgomery multiplication solution through iterant processing cycles. The Montgomery recoder 110 and the multiple modulus generator 120 are employed to select the modulus product $MM_I$. In selecting the modulus product MK, the Montgomery recoder 110 receives iterant data from the accumulator 150. The iterant data $SPP_I$[1:0] in this exemplary embodiment of the present invention may be generated based on a sum $ACC\_S\_REG_I$[1:0], a carry $ACC\_C\_REG_I$[1:0], a lower value $ACC\_L\_REG_I$[2:0], and a partial product $PP_I$[1:0], all stored in the accumulator 150, and on a shift control signal SHIFT_ACC for feedback input of the accumulator 150. The iterant data $SPP_I$[1:0] may be variable in bit length (or size) according to the exemplary embodiments of the present invention. For example, $SPP_I$ can have more than two (2) bits, as can other elements of the embodiment.

Figure 10:
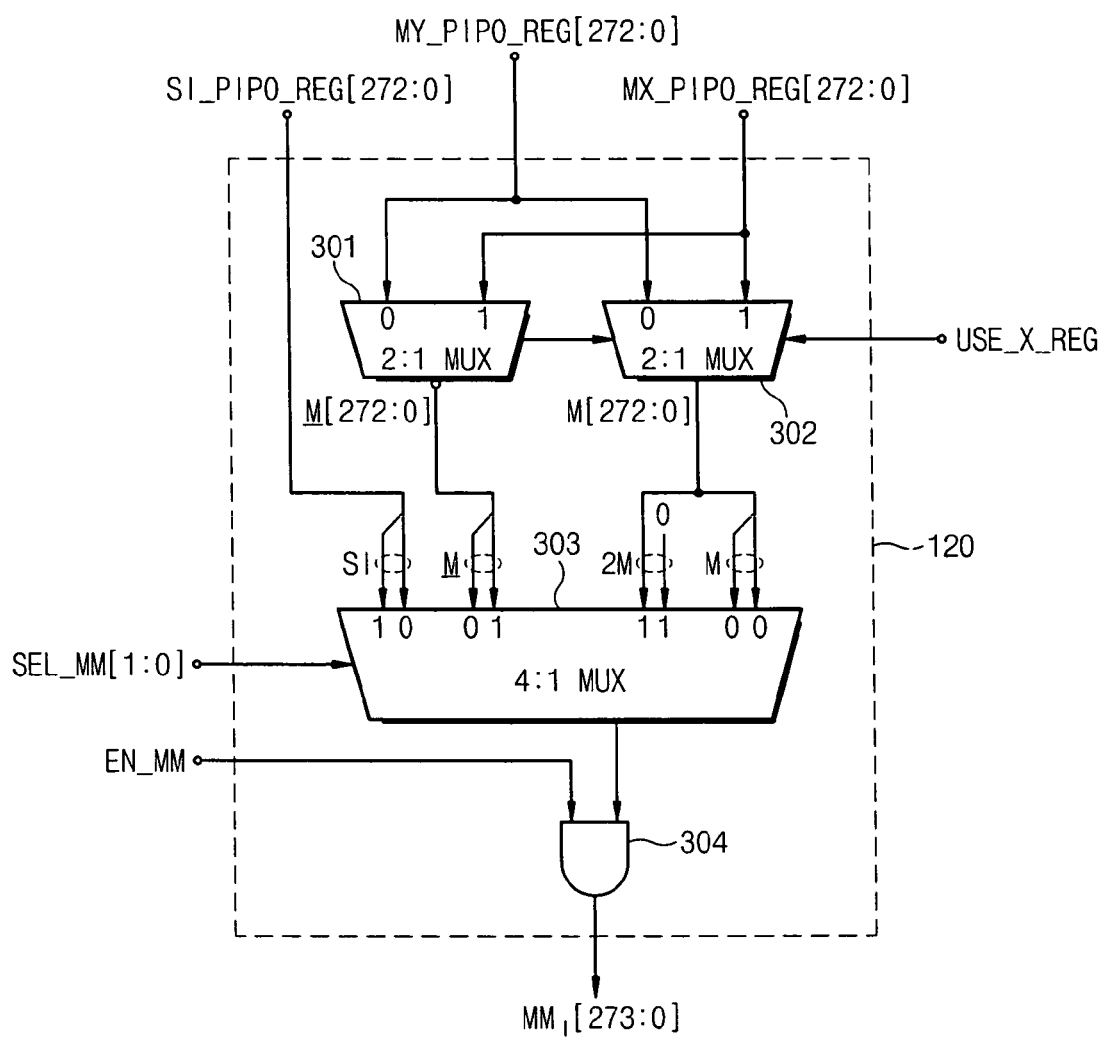
FIG. 10 illustrates a structure of a multiple modulus generator 120 (also known as a modulus product generator) for generating a modulus product value $MM_f$, in accordance with an exemplary embodiment of the present invention.

FIG. 10 illustrates a structure of the multiple modulus generator 120 for generating the modulus product $MM_I$, in accordance with an exemplary embodiment of the present invention. The multiple modulus generator 120 may include multiplexers 301~303 and an AND gate 304. Multiplexer 302 outputs one of moduli MY_PIPO_REG[272:0] and MX_PIPO_REG[272:0], which are provided from the modulus registers 102 and 103, in response to a register selection signal USE_X_REG.

Multiplexer 303 outputs one of a previous value SI_PIPO_REG[272:0], M, 2M, and −M in response to a modulus product selection signal SEL_MM[1:0]. The value 2M can be obtained by shifting the value M, which is output from the multiplexer 302, to the left with 1 bit and then inserting '0' in the LSB position. The value −M can be obtained by bit-inverting the M that is output from the multiplexer 302.

The AND gate 304 combines a modulus product enable signal EN_MM from the Montgomery recoder 110 (see FIG. 8A) with an output of the multiplexer 303 to output the modulus product $MM_I$. The modulus product $MM_I$ may be composed of (c+w/2)+2 bits. For example, when c=256 and w=16, $MM_I$ is 274 bits. The modulus product enable signal EN_MM may be used for setting the modulus product $MM_I$ on '0'. The modulus product $MM_I$ is supplied to the accumulator 150, as shown in FIG. 8B.

FIG. 11 is a truth table to illustrate an arrangement of codes in the Montgomery recoder 110 in accordance with an exemplary embodiment of the present invention. Although FIG. 11 shows three inputs M[1] and $SPP_I[1:0]$ supplied to the Montgomery recoder 110, the exemplary embodiments could be configured as having any number of desired inputs and outputs.

As discussed previously, the modulus product $MM_I$ in a typical radix-4 system may include 0, M, 2M, and 3M. Obtaining 3M typically requires an additional adder or a memory element for adding 2M to M. Addition of the adder and/or memory element contributes to hardware size and/or computational delay, which affects computational speed and power usage. The coding scheme shown in FIG. 11 uses bit-inversion and bit-shift to obtain the modulus product $MM_I$ without an additional adder or memory element. The Montgomery recoder 110 receives the second LSB M[1] of the modulus M and the two LSBs of $SPP_I$, i.e., $SPP_I[1:0]$. The Montgomery recoder 110 outputs the modulus product selection signal SEL_MM[1:0], the modulus product enable signal EN_MM, and a sign inversion signal NEG_MM to indicate sign inversion (i.e., the signal NEG_MM indicates whether bit-inversion is used, obtaining −M).

Figure 13:
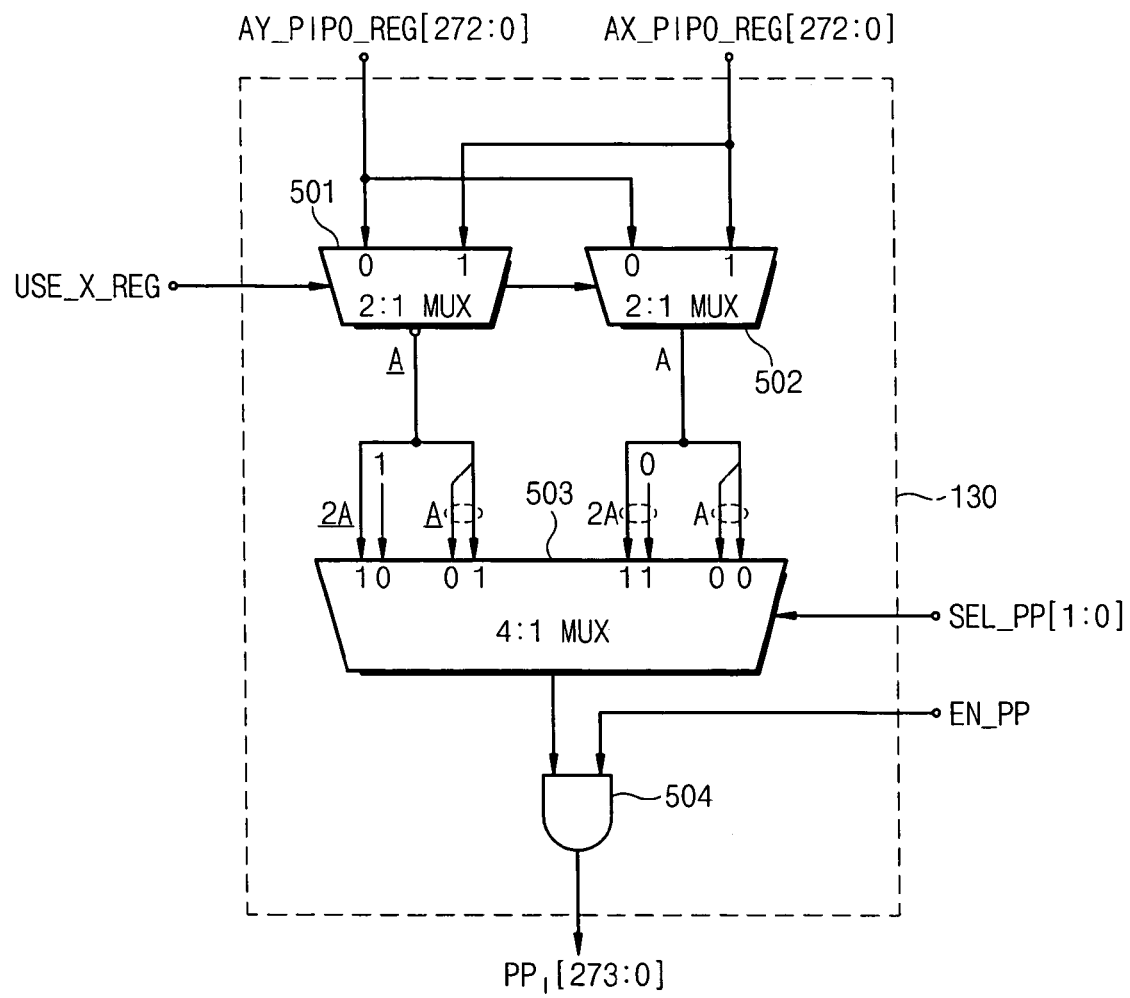
FIG. 13 illustrates an exemplary circuit of a partial product generator 130 in accordance with an exemplary embodiment of the present invention.

In another exemplary embodiment of the present invention, a similar method for reducing hardware size, enhancing computational speed and/or reducing power consumption can be used in the partial product generator 130 and the Booth recoder 140 shown in FIGS. 13 and 14, respectively. In general, the Montgomery multiplier 10 receives the modulus product $MM_I$ and the partial product $PP_I$ through the accumulator 150 and then performs modulo-multiplication with iterant operation cycles. FIGS. 13 and 14 will be discussed in more detail hereafter.

Figure 12:
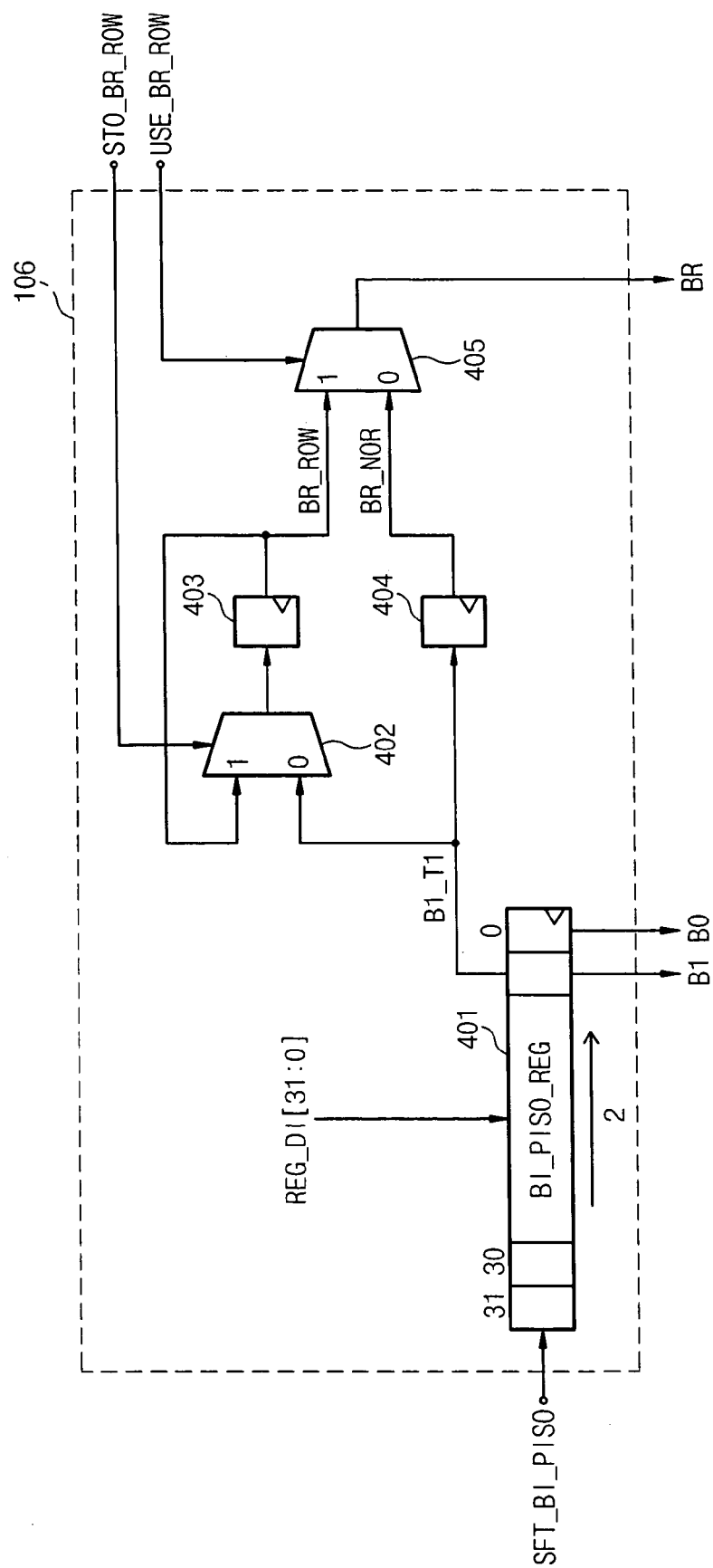
FIG. 12 illustrates a register storing a multiplier value B in accordance with an exemplary embodiment of the present invention.

FIG. 12 illustrates the register 106 storing the multiplier B, in accordance with an exemplary embodiment of the present invention. The multiplier register 106 stores the multiplier B received from memory 40 and then outputs with shifting a higher bit BR, among the LSBs B1 and B0 and the lower LSBs of the previous cycle of the multiplier B, to the right once every cycle, except for the cycle for correcting an initial value of the accumulator 150. As shown in FIG. 12, the multiplier register 106 includes a shift register 401, multiplexers 402 and 405, and flipflops 403 and 404.

The shift register 401 may be configured with the same bit length as the word length (w=32), and may be operable in response to a shift selection signal SFT_BI_PISO. The shift register 401 newly receives a word of multiplier data through REG_DI[31:0] of the memory interface 12 when the shift selection signal SFT_BI_PISO is a logic '0', while it shifts the received word to the right by two bits when the shift selection signal SFT_BI_PISO is a logic '1'. The two LSBs B1 and B0 of the shift register 401 are output to the booth recorder Booth recoder 140.

A signal STO_BR_ROW is provided to store the second LSB B1 that has been used in the last cycle of the unit multiplying operation for low (i.e., when the shift selection signal SFT_BI_PISO is a logic '0'). The multiplexer 402 selectively outputs a value stored in the flipflop 403 or the second LSB B1 of the shift register 401. The flipflop 403 stores an output of the multiplexer 402 and the flipflop 404 stores the second LSB B1 of the shift register 401. A signal USE_BR_ROW is provided to control the value BR ROW of the flipflop 403 to be selected as the bit BR in the second cycle (i.e., the next cycle after the cycle for correcting an initial value of the accumulator 150). The bit BR is supplied to the Booth recoder 140.

The Booth recoder 140 and the partial product generator 130 are employed to select the values of the partial product $PP_I$, 0, A, A, 2A and 2A, to be supplied to the accumulator 150. As illustrated in FIGS. 8A to 8C, the Booth recoder 140 receives the bits B1, B0 and BR of the multiplier B from the register 106, and supplies the partial product selection signal SEL_PP[1:0] to the partial product generator 130, the partial product enable signal EN_PP to the partial product generator 130, and the partial product sign inversion signal NEG_PP to the accumulator 150.

FIG. 13 illustrates an exemplary circuit of the partial product generator 130 in accordance with an exemplary embodiment of the present invention. The partial product generator 130 may include multiplexers 501~503 and an AND gate 504. The multiplexer 501 outputs a given multiplicand value A (i.e., A[272:0]) among the multiplicands AY_PIPO_REG[272:0] and AX_PIPO_REG[272:0] supplied from the registers 104 and 105, in response to the register selection signal USE_X_REG.

The multiplexer 503 outputs a multiplicand value selected from 2A, A, 2A, and A in response to the modulus product selection signal SEL_PP[1:0] supplied by the Booth recoder 140. The value 2A is obtained by shifting A, which is output from the multiplexer 501, to the left by one bit and inserting '1' in the least significant bit position thereof. The value 2A is obtained by shifting A, which is output from the multiplexer 502, to the left by one bit and inserting '0' in the LSB position thereof.

The AND gate 504 outputs the partial product $PP_I$ by logically combining the partial product enable signal EN_PP of the Booth recoder 140 and an output of the multiplexer 503. The partial product enable signal EN_PP is used for creating '0' as the partial product $PP_I$. The partial product $PP_I$ may be sized in (c+w/2)+2 bits. In this example, the partial product $PP_I$ is 274 bits when c=256 and w=32. The partial product $PP_I$ is supplied to the accumulator 150.

FIG. 14 is a truth table to illustrate an arrangement of codes in the Booth recoder 140 in accordance with an exemplary embodiment of the present invention. While FIG. 14 discloses three inputs B1, B0, and BR supplied to the Booth recoder 140, the exemplary embodiments could be configured as having any number of desired inputs and outputs.

Referring again to FIGS. 8A to 8C, the modulus product $MM_I[273:0]$ generated by the multiple modulus generator 120 and the partial product $PP_I[273:0]$ generated by the partial product generator 130 are supplied to the accumulator 150.

Figure 15:
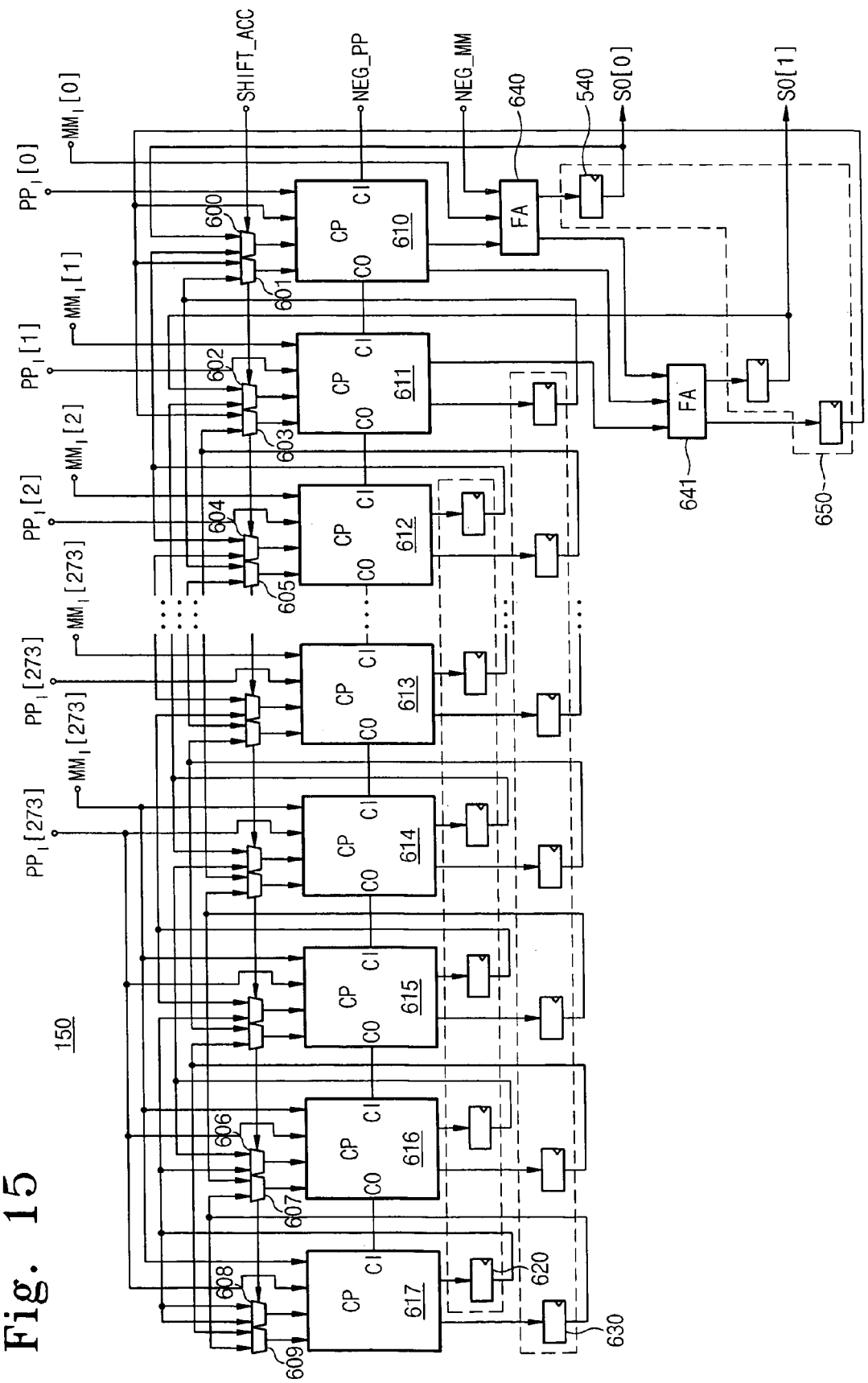
FIG. 15 illustrates an accumulator 150 according to an exemplary embodiment of the present invention.

FIG. 15 illustrates the accumulator 150 according to an exemplary embodiment of the present invention. Referring to FIG. 15, the accumulator 150 may be composed of serially connected 4:2 compressors 610~617 that are in number of c'=c+w/2+5 bits. As previously discussed with reference to FIGS. 10 and 13, each bit length of the modulus product $MM_I$ and the partial product $PP_I$ is (c+w/2)+2 bits.

The accumulator 150 may divisionally store an operation result in a sum register 620, a carry register 630, and a lower value register 650. The sum register 620 may be composed of flipflops in number of (c+w/2)+3 bits. The carry register 630 may be composed of flipflops in number of (c+w/2)+4 bits. The lower value register 650 may be composed of three flipflops. The CPA block 160 shown in FIG. 8B receives lower c+1 bits ACC_S_REG[c:0] and ACC_C_REG[c:0] each among outputs of the sum register 620 and the carry register 630, and the MSB ACC_L_REG[2] among output bits of the lower value register 650. Further, the two LSBs ACC_L_REG[2:0] of the lower value register 650 are supplied to an SPP generator 170, as shown in FIG. 8c.

In this exemplary embodiment, inputs to the accumulator 150 include the modulus product $MM_I$, the partial product $PP_I$, the modulus product inversion signal NEG_MM, the partial product inversion signal NEG_PP, and the shift control signal SHIFT_ACC for a feedback input of the accumulator 150. The exemplary accumulator 150 may be designed in the architecture of CSA, preventing performance degradation due to a carry propagation delay. Each of the compressors 610~617 may comprised of four inputs and two outputs, i.e., 4:2 compressor.

Figure 18:
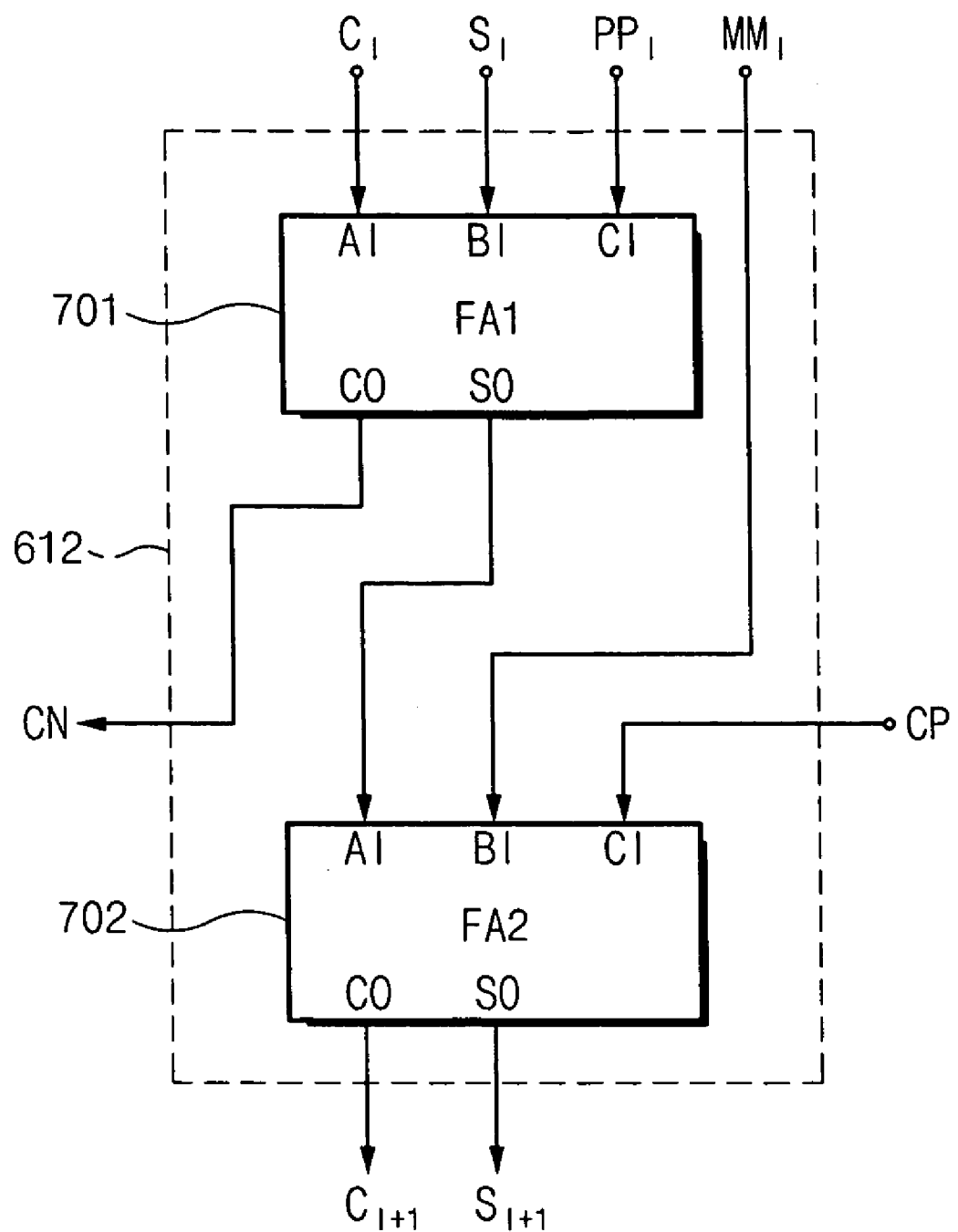
FIG. 18 illustrates an exemplary circuit of a 4:2 compressor according to an exemplary embodiment of the present invention.

FIG. 18 illustrates an exemplary circuit of the 4:2 compressor. The compressor 612 has a plurality of inputs. Input values of the compressor have a loop index I and output values have a loop index I+1.

For this example, the compressor 612 may includes full adders 701 and 702. The first full adder 701 receives $C_I$, $S_I$, and $PP_I$, and then outputs a first full adder carry C0 and a first full adder sum S0. The first full adder carry C0 is output as an output carry CN, which becomes an input CP of the next higher bit position compressor $k_{+1}$ (which would be the compressor next to compressor 612 between compressors 612 and 613 in FIG. 15). The second full adder 702 receives the first full adder sum S0, the modulus product $MM_I$, and a carry CP of the 1-bit lower value position compressor (i.e., compressor 611), and outputs a second full adder carry C0 and a second full adder sum S0. The second full adder carry C0 is output as the next carry bit $C_{I+1}$, which is used as a carry $C_I$ that is applied to the 1-bit lower value position compressor 611. The second full adder sum S0 is used as a sum $S_I$ that is applied to the 2-bit lower value position compressor. The lowest bit position compressor (i.e., compressor 610) receives the partial product inversion signal NEG_PP as an input of the carry CP.

The relation between the input and output of the 4:2 compressor 612 may be summarized by the following Equation 2.

$$2CN+2C_{I+1}+S_{I+1}=CP+C_I+S_I+PP_I MM_I \quad [\text{Equation 2}]$$

Returning to FIG. 15, the full adder 640 receives a sum $S_I[0]$ output from the first compressor 610, the lowest bit $MM_I[0]$ of the modulus product, and the modulus product inversion signal NEG_MM. The full adder 641 receives a sum bit output from the second compressor 611, a carry bit output from the first compressor 610, and a carry bit output from the full adder 640. The sum of the full adder 640, and the sum and carry of the full adder 641 are stored in the lower value register 650.

The accumulator 150 accumulates a result, corresponding to a current unit multiplying operation, from results for the previous row in the first cycle of the unit multiplying operation. Such a procedure is referred to as an initial value correction cycle, for which the multiplexers 600~609 are provided therein.

An input terminal of one compressor is coupled to two multiplexers. As an example, two multiplexers 600 and 601 are coupled to the first compressor 610 corresponding to the LSBs $MM_I[0]$ and $PP_I[0]$ of the modulus and partial products. Multiplexer 600 receives a sum bit ACC_S_REG[0] as a first input and a lower value ACC_L_REG[0] as a second input, which are supplied from its 2-bit higher bit position compressor. Multiplexer 601 receives a sum bit ACC_S_REG[0] as a first input and a lower value ACC_L_REG[2] as a second input, which are supplied from its 1-bit higher bit position compressor 611.

For the second compressor 611, multiplexer 602 receives a sum bit ACC_S_REG[1] as a first input and a lower value ACC_L_REG[1] as a second input, which are supplied from its 2-bit higher bit position compressor. Multiplexer 603 receives a sum bit ACC_S_REG[1] as a first input and a lower value ACC_L_REG[2] as a second input, which are supplied from its 1-bit higher bit position compressor 612.

As to third compressor 612, multiplexer 604 receives a sum bit ACC_S_REG[2] of its 2-bit higher compressor as a first input, and a sum bit ACC_S_REG[0] of the compressor 612 coupled thereto as a second input. Multiplexer 605 receives a carry bit ACC_C_REG[2] of its 1-bit higher compressor as a first input and a carry bit ACC_C_REG[0] of its 1-bit lower compressor (i.e., compressor 611) as a second input.

The first and second multiplexers coupled to the third compressor 612 through the last compressor 617 are constructed in the same architecture. But, the first input of multiplexer 608 coupled to the highest compressor 617 is a sum bit of the compressor 617 connected to itself, while the first input of the second multiplexer 609 is a carry bit of the compressor 617 connected to itself.

The first input of the first multiplexer 606, coupled to the compressor 616 that is positioned lower than the highest bit position, is a sum bit of its 1-bit higher compressor 617. The modulus and partial products, $PP_I$ and $MM_I$, supplied to the four higher compressors from the highest bit position, 617, 616, 615, and 614, are each same, which are the MSBs of $MM_I$ and $PP_I$.

Figure 16:
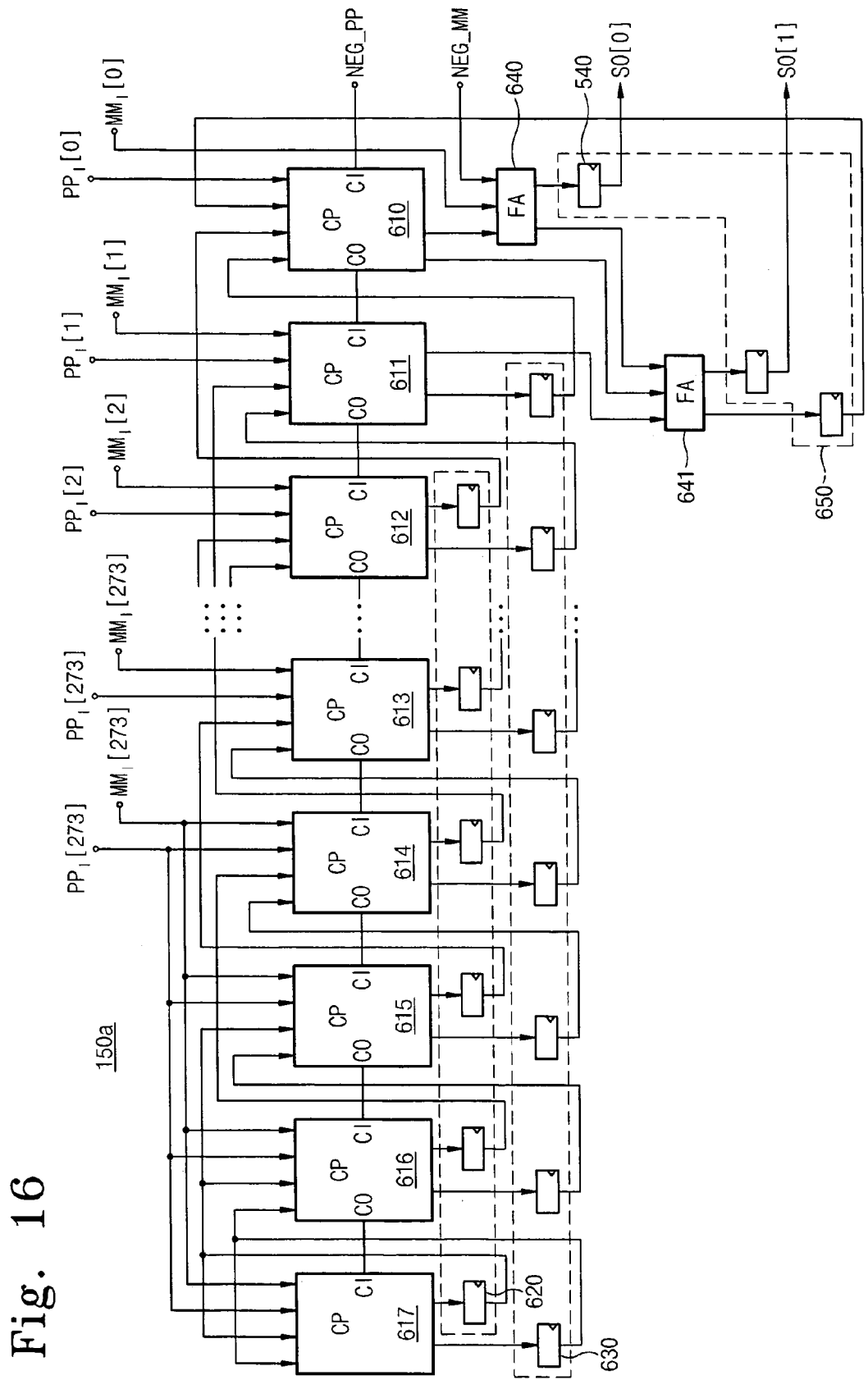
FIG. 16 illustrates an arrangement of signals input to compressors in an exemplary accumulator when a shift signal SHIFT_ACC is logically '1'.

FIG. 16 illustrates an arrangement of signals input to compressors when the shift signal SHIFT_ACC is a logic '1'. The shift signal SHIFT_ACC is a logic '0' during a cycle just after the initial value correction cycle of the accumulator, while a logic '1' during the remaining cycles. When the shift signal SHIFT_ACC is a logic '1', each of the first and second multiplexers, 600, 602, ..., and 608, and 601, 603, ..., and 609 outputs its first input as an output thereof, as shown in FIG. 16.

For all cycles except the initial value correction cycle of the accumulator 150, a sum SO[1:0] stored in the lower value register 650 is output. Carries, sums and lower values supplied by the compressors 612~617 are each stored in the carry register 630, the sum register 620, and the lower value register 650, and turned to feedback loops for the compressors 610~617 in the next cycle. Since the partial products and multiple modulus products to be accumulated in the next cycle are higher than those of the previous cycle by two bits, they are required to be input with feedback to bit positions lower than those of the previous storage position by two bits.

Figure 17:
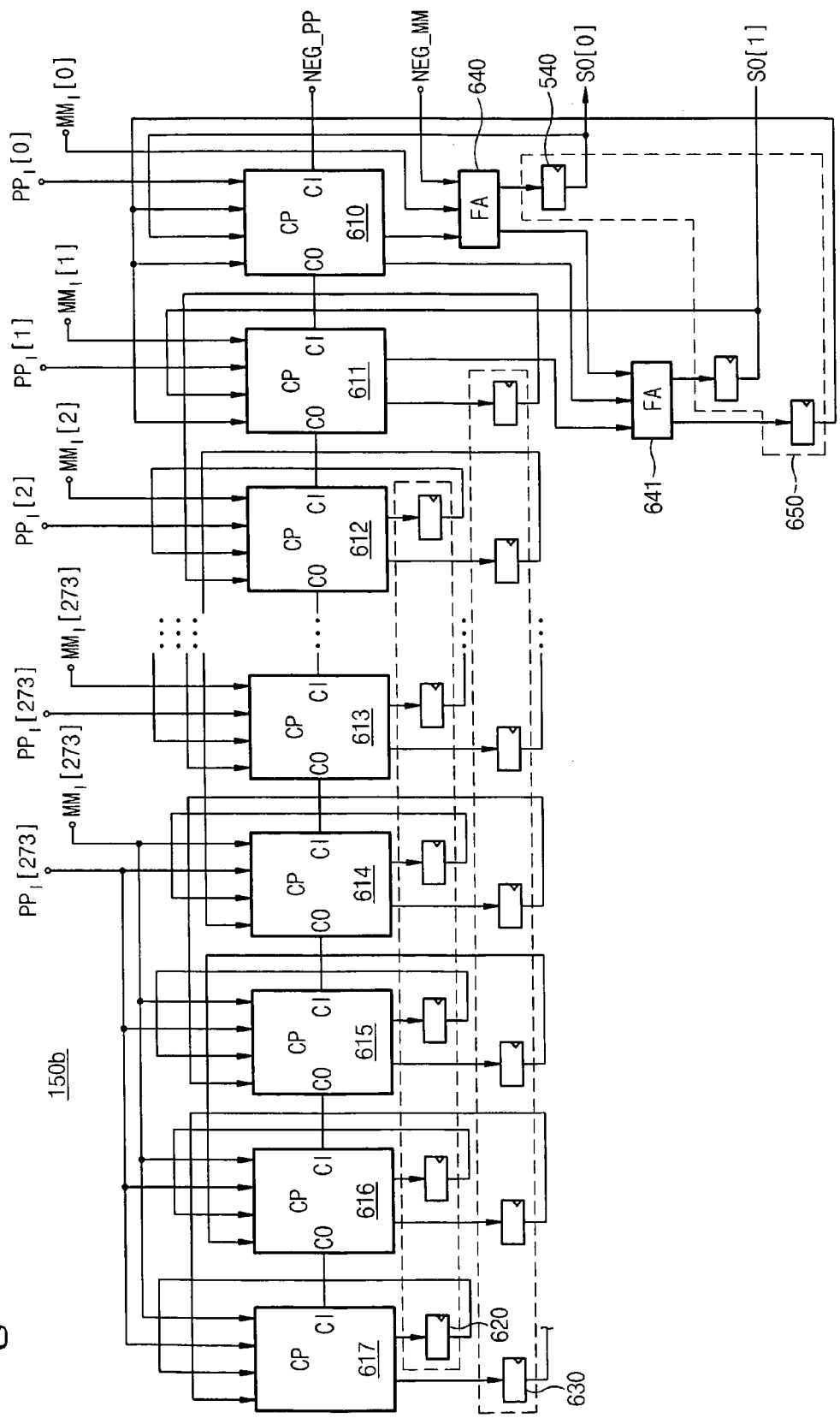
FIG. 17 illustrates an arrangement of signals input to compressors in an exemplary accumulator when a shift signal SHIFT_ACC is logically '0'.

FIG. 17 illustrates an arrangement of signals input to compressors when the shift signal SHFT_ACC is a logic '0'. When the shift signal SHIFT_ACC is a logic '0', each of the first and second multiplexers, 600, 602, ..., and 608, and 601, 603, ..., and 609, outputs its second input as an output thereof, as shown in FIG. 17.

During the initial value correction cycle of the accumulator 150 for each box, the accumulator 150 performs an operation for correcting the initial value of the accumulator 150 by accumulating a value, which matches a value stored in the register in a given bit position, among resultant values of the previous row. At this time, values stored in the sum register 620, the carry register 630 and the lower value register 650 may be supplied in the feedback loop as inputs to the accumulator 150, without changes of bit positions.

As described above, the partial product is $PP_I=\{-2A, -A, 0, +A, +2A\}$ and the modulus product is $MM_I=\{SI, -M, 0, +M, +2M\}$. For the initial value correction cycle of the accumulator 150, 0 and SI are selected as the partial product $PP_I$ and the modulus product $MM_I$, respectively. For all remaining cycles save for the initial value correction cycle of the accumulator 150, the partial products $PP_I$ and modulus products $MM_I$ are selected in accordance with the coding scheme shown in the truth tables of FIGS. 11 and 14.

The values −A and −M selected as the partial and modulus products may be obtained from bit inversion. The values +2A and +2M may be obtained from shifting A and M to left each by one bit, and the value −2A may be obtained from bit inversion after shifting A to the left by one bit. The results of the partial and modulus products, obtained by means of left shifting and bit inversing operations, may be referred to as 1's complement numbers. The multiplier 10 according to the exemplary embodiments of the present invention may be configured for operation using a system of 2's complement numbers, for example. The 2's complement number is identical to the number obtained from adding '1' to the 1's complement number. The partial product inversion signal NEG_PP and the modulus product inversion signal NEG_MM may be used for representing the 1's complement numbers −A, −2A, and −M as their 2's complement numbers. In other words, the partial product inversion signal NEG_PP becomes '1' when the partial product PP is −A or −2A, but becomes '0' when the partial product PP is 0, +A, or +2A. The modulus product inversion signal NEG_MM is set to '1' if the modulus product $MM_I$ is −M, but set to '0' when the modulus product $MM_I$ is SI, 0, +M, or +2M.

The Montgomery multiplier according to the exemplary embodiments of the present invention may be configured in the form of operation matrix as illustrated by FIG. 1, in order to perform a multi-precision operation. Also, internal data of the exemplary Montgomery multiplier may be represented with optimized bit lengths without data overflows, thus preventing too many bits from being unnecessarily assigned thereto. The following mathematical analysis may offer exemplary ranges of operational resultant values for each row in the operation matrix, which thereby determine the number of bits required for representing the operational results for each row. Among the rows of the operation matrix shown in FIG. 1, the all rows except for the last row utilize the multiplicand A, the multiplier B, and the modulus M as follows.

M: $2^{n-1}+1 \leq M \leq 2^n-1$

A: $-M \leq A \leq +M$

B: $-2^{c+w/2-1} \leq B \leq 2^{c+w/2-1}$ [Equation 3]

An intermediate result $S_0$ generated from the first row (see FIG. 1, ROW_0) is defined by Equation 4.

$$S_o = \frac{A \cdot B + Q \cdot M}{R}$$ [Equation 4]

In Equation 4, R represents a constant of 2c+w/2. As the exemplary Montgomery multiplier described herein is associated with the radix-4 architecture, the multiplier processes 2 bits of the multiplier B every cycle. And, the value of Q used in every cycle is an alternative one of $\{-1, 0, +1, +2\}$. Thus, the maximum and minimum values for Q in a given row may be defined as follows in Equation 5.

$$\text{Max}(Q) = (+2) \cdot 2^0 + (+2) \cdot 2^2 + (+2) \cdot 2^4 + \ldots +$$ [Equation 5]

$$(+2) \cdot 2^{c+w/2-2}$$

$$= 2 \cdot \left[\frac{4^{\frac{c+w/2}{2}}-1}{4-1}\right] = \frac{2}{3} \cdot (2^{c+w/2}-1)$$

$$\text{Min}(Q) = (-1) \cdot 2^0 + (-1) \cdot 2^2 + (-1) \cdot 2^4 + \ldots +$$

$$(-1) \cdot 2^{c+w/2-2}$$

$$= -1 \cdot \left[\frac{4^{\frac{c+w/2}{2}}-1}{4-1}\right] = -\frac{1}{3} \cdot (2^{c+w/2}-1)$$

With the above condition, the maximum and minimum values of the intermediate result $S_0$ may be obtained by the following Equation 6.

$$\text{Max}(S_0) =$$ [Equation 6]

$$\frac{M \cdot (2^{c+w/2-1}-1) + \frac{2}{3} \cdot (2^{c+w/2}-1) \cdot M}{2^{c+w/2-1}} \cdot \left(\frac{1}{2}+\frac{2}{3}\right) \cdot M = \frac{7}{6} \cdot M$$

$$\text{Min}(S_0) =$$

$$\frac{M \cdot (-2^{c+w/2-1}-1) - \frac{1}{3} \cdot (2^{c+w/2}-1) \cdot M}{2^{c+w/2-1}} \cdot \left(-\frac{1}{2}-\frac{2}{3}\right) \cdot M = -\frac{5}{6} \cdot M$$

As the modulus M is composed of n-bits, the number of bits requiring representation by a number within the boundary described above is n+2 bits, including a sign bit.

An intermediate result $S_1$ arising from the second row (FIG. 1, ROW_1) is obtained with the former intermediate result $S_0$ of the first row. The calculation for $S_1$ may be as described in Equation 7 below.

$$S_1 = \frac{S_0 + A \cdot B + Q \cdot M}{R}$$ [Equation 7]

The maximum and minimum values of $S_1$ may be defined by Equation 8 below.

$$\text{Max}(S_1) = \frac{\frac{7}{6} \cdot M + M \cdot (2^{c+w/2-1} - 1) + \frac{2}{3} \cdot (2^{c+w/2} - 1) \cdot M}{2^{c+w/2}} = $$

$$\left(\frac{7}{6} \cdot \frac{1}{2^{c+w/2}} + \frac{1}{2} + \frac{2}{3}\right) \cdot M = \frac{7}{6} \cdot \left(\frac{1}{2^{c+w/2}} + 1\right) \cdot M = \frac{7}{6} \cdot M$$

[Equation 8]

$$\text{Min}(S_1) = $$

$$\frac{-\frac{5}{6} \cdot M + M \cdot (-2^{c+w/2-1} - 1) - \frac{1}{3} \cdot (2^{c+w/2} - 1) \cdot M}{2^{c+w/2}} = $$

$$\left(-\frac{5}{6} \cdot \frac{1}{2^{c+w/2}} - \frac{1}{2} - \frac{1}{3}\right) \cdot M = $$

$$-\frac{5}{6} \cdot \left(\frac{1}{2^{c+w/2}} + 1\right) \cdot M = -\frac{5}{6} \cdot M$$

The number of bits to represent the number in the range established by the above Equation 8 is also n+2 bits. By the same manner, an intermediate result $S_2$ of the third row (FIG. 1, ROW_2) can be also represented in n+2 bits.

Otherwise, a resultant value for a single precision, where a single set of a result and row exists for the last row of the multi-precision, may be represented in n+1 bits including a sign bit. This feature may be proved by the procedure below.

The ranges of the multiplicand A, multiplier B, and modulus M may be set by the following arrangement in Equation 9.

M: $2^{n-1+1} \leq M < 2^{n-1}$; $2^{cp-1+1} \leq M < 2^{cp-1}$

A: $-M \leq A < +M$

B: $-M \leq B < +M$   [Equation 9]

The final result S may be summarized as shown in Equation 10.

$$S = \frac{A \cdot B + Q \cdot M}{R}$$  [Equation 10]

In Equation 10, the parameter R is a constant equal to $2^{(c+w/2)p}$. The maximum and minimum values of Q shown in Equation 10 may be defined by the expressions in Equation 11.

$$\text{Max}(Q) = (+2) \cdot 2^0 + (+2) \cdot 2^2 + (+2) \cdot 2^4 + \ldots +$$  [Equation 11]

$$(+2) \cdot 2^{(c+w/2)p-2}$$

$$= 2 \cdot \left[\frac{4^{\frac{(c+w/2)p}{2}} - 1}{4 - 1}\right] = \frac{2}{3} \cdot (2^{(c+w/2)p} - 1)$$

$$\text{Min}(Q) = (-1) \cdot 2^0 + (-1) \cdot 2^2 + (-1) \cdot 2^4 + \ldots +$$

$$(-1) \cdot 2^{(c+w/2)p-2}$$

$$= -1 \cdot \left[\frac{4^{\frac{(c+w/2)p}{2}} - 1}{4 - 1}\right] = -\frac{1}{3} \cdot (2^{(c+w/2)p} - 1)$$

Therefore, the maximum and minimum values of the final result S may be obtained by the following Equation 12.

$$\text{Max}(S) = \frac{M \cdot (2^{c \cdot p} - 1) + \frac{2}{3} \cdot (2^{(c+w/2) \cdot p} - 1) \cdot M}{2^{(c+w/2) \cdot p}} \cdot$$  [Equation 12]

$$\left(\frac{1}{2^{(w/2) \cdot p}} + \frac{2}{3}\right) \cdot M = +M$$

$$\text{Min}(S) = \frac{M \cdot (-2^{c \cdot p} - 1) - \frac{1}{3} \cdot (2^{(c+w/2) \cdot p} - 1) \cdot M}{2^{(c+w/2) \cdot p}} \cdot$$

$$\left(-\frac{1}{2^{(w/2) \cdot p}} - \frac{1}{3}\right) \cdot M = -M$$

The number of bits to represent the numbers in the range of the above conditions is n+1.

As stated above, in the multi-precision operating scheme, data overflow may be generated beyond the range of +M for the intermediate results determined from the other rows (internal rows ROW_0 to ROW_2 of FIG. 1) but the intermediate results for the last row (ROW_3 of FIG. 1) is conditioned to be near the maximum value. Such a condition corresponds to a value of Q being selected for every cycle that is almost +2 around the higher bit position, and a sign of the multiplicand A that is identical to a chunk sign of the multiplier value B used in its corresponding internal row.

An operation result for each row is represented in n+2 bits. However, as n is an integer-multiple of w and the memory 40 is sized as an integer-multiple of w, it is not efficient to store the additional two bits in the memory 40. Therefore, in accordance with the exemplary embodiments of the present invention, lower n bits among the n+2 bits may be stored in the memory 40 and the remaining 2 bits (i.e., the sign bit, which is the highest bit (MSB), and the second MSB) are stored in the internal register (FIG. 3, SFR 13) of the Montgomery multiplier 10. The higher 2 bits may be referred to as SIGN_S and MS1B_S.

After completing the operation process up until the last row, the sign bit sign SIGN_S and the second higher bit MS1B_S are the same value. But, after completing the operation process for the internal rows, the second higher bit may be '1' with the sign bit set to '0'.

The Montgomery multiplier data path 100 according to an exemplary embodiment of the invention may further include shift registers 106, 115, 116 and 180. The accepted bit length in each of the shift registers 106, 115, 116, 180 is w, and the bits thereof may be shifted in each register to the right by 2 bits a cycle. The registers 106 and 115 may be parallel-in serial-out shift registers, while the registers 116 and 180 may be serial-in parallel-out shift registers.

The modulus product $MM_I$ that is generated every cycle may be assigned to the previous result SI only in the initial value correction cycle of the accumulator 150. The $MM_I$ generated every cycle may selected by $q_I M$ as determined by the truth table shown in FIG. 11 for the other cycles. Here, $q_I$ is one of $\{-1, 0, 1, 2\}$.

For the rows shown in FIG. 1, the first unit multiplying operations CSA0.0, CSA1.0, CSA2.0, and CSA3.0 (hereinafter referred to as "Gen-Q Box") may be carried out with the calculation of $q_I$. The determined $q_I$ value may be stored in the memory 40 in order to reuse $q_I$ in unit multiplying operations on the same row. The Montgomery recoder 110 shown in FIGS. 8A to 8C generates a value QO[1:0] with a sign of two (2) bits for all cycles except the initial value correction cycle of the accumulator 150 for the first unit multiplying operations Gen-Q Box of each row, and then stores the QO[1:0] values in the shift register 116.

Figure 19:
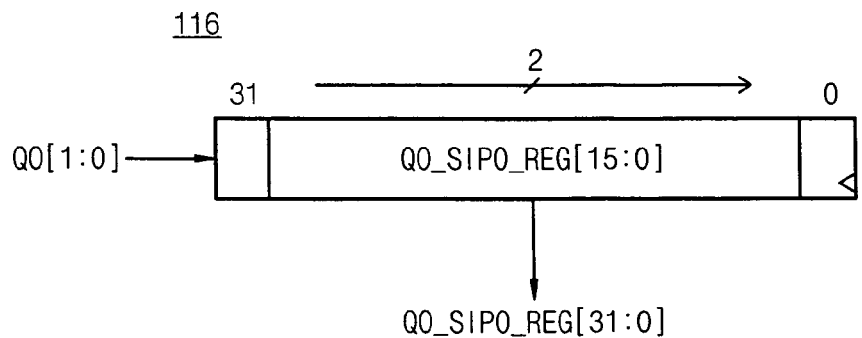
FIG. 19 illustrates a detailed configuration of a shift register 116 according to an exemplary embodiment of the present invention.

FIG. 19 illustrates a detailed configuration of the shift register 116 that is QO_SIPO_REG[15:0]. The shift register 116 moves data bits to the right by 2 bits a cycle and stores QO[1:0], supplied by the Montgomery recorder 110, at the higher 2-bit positions. The shift register 116 transfers its data (i.e., QO_SIPO_REG[31:0]) to the memory 40 whenever new word-length data is introduced thereto.

Figure 20:
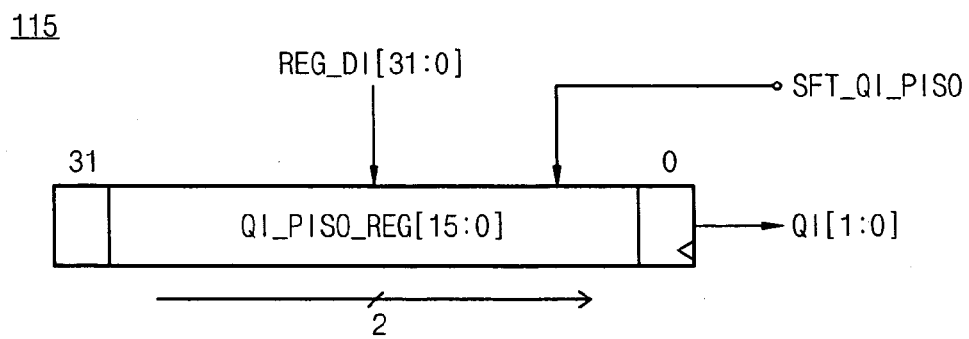
FIG. 20 illustrates a detailed configuration of a shift register 115 according to an exemplary embodiment of the present invention.

FIG. 20 illustrates a detailed configuration of the shift register 115 that is QI_PISO_REG[15:0]. QO stored in the memory 40 is transferred to the shift register 115 in the unit of the word length w. The lower values QI[1:0] of the shift register 115 are supplied to the Montgomery recorder 110. The shift register 115 receives new data from memory 40 in response to a clock signal when the shift control signal SFT_QI_PISO is '0', but shifts its data to the right by 2 bits when the shift control signal SFT_QI_PISO is '1'.

For all remaining unit multiplying operations CSA0.1~CSA0.3, CSA1.1~CSA1.3, CSA2.1~CSA2.3, and CSA3.1~CSA3.3 (hereinafter, 'Gen-S Box') except for the first unit multiplying operations Gen-Q Box for each row, 2-bit multiplication results SO[1:0] (which represent a sum of the accumulator 150) are generated for every cycle except for the initial value correction cycle of the accumulator 150. The SO[1:0] values are stored in the shift register 180 in sequence.

Figure 21:
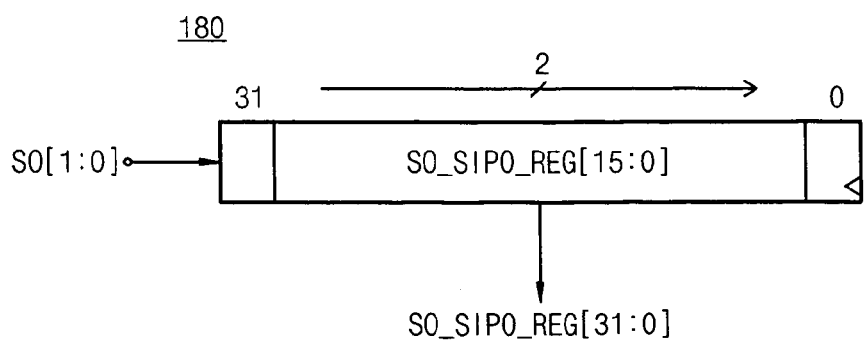
FIG. 21 illustrates a detailed configuration of a shift register 180 for storing a sum S0[1:0] of the accumulator 150, according to an exemplary embodiment of the present invention.

FIG. 21 illustrates a detailed configuration of the shift register 180 for storing a sum SO[1:0] of the accumulator 150. The shift register 180 moves its data to the right by 2 bits a cycle in response to a clock signal, and stores SO[1:0] values of the accumulator 150 at the higher 2-bit positions. The shift register 180 transfers its data SO_SIPO_REG[31:0] to the memory 40 whenever new word-length data is introduced thereto.

Figure 22:
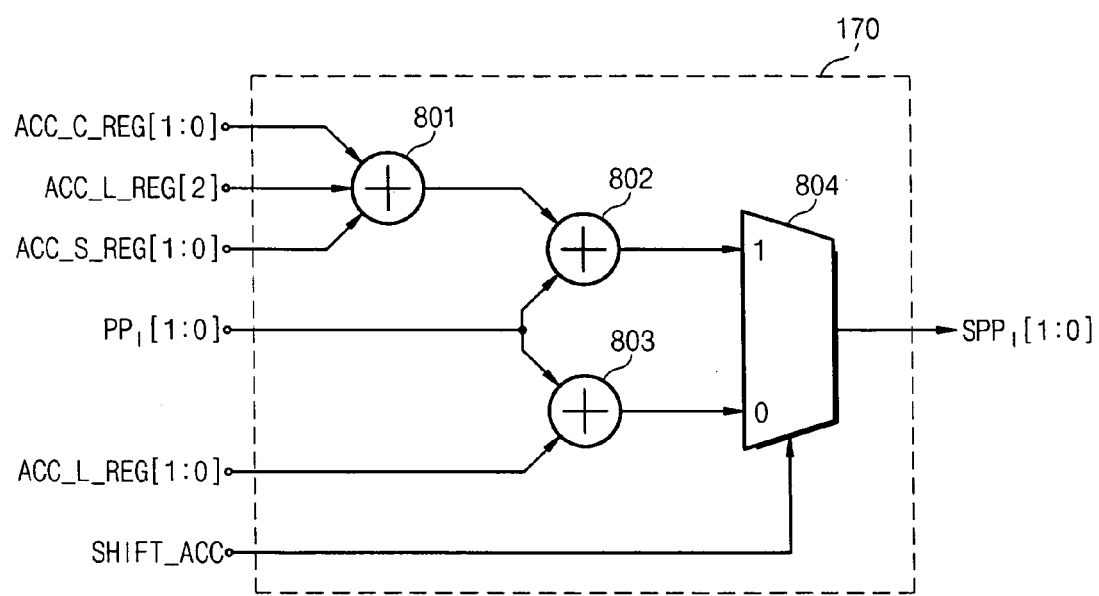
FIG. 22 illustrates a circuit for generating $SPP_f[1:0]$ to be supplied to the Montgomery recoder 110, according to an exemplary embodiment of the present invention.

FIG. 22 illustrates a SPP generating circuit 170 for generating partial product iterant data SPPI[1:0] used in the Montgomery recoder 110. The partial product iterant data $SPP_I[1:0]$ may be determined based on a sum stored in the accumulator 150, the two LSBs ACC_S_REG[1:0] of the sum registers 620 and ACC_C_REG[1:0] of the carry registers 630, the value ACC_L REG[2:0] of the lower value register 650, the two LSBs $PP_I[1:0]$ of the partial product, and the shift control signal SHIFT_ACC for the feedback input of the accumulator 150. The values ACC_S_REG[1:0], ACC_C_REG[1:0], and ACC_L_REG[2:0] may be summed by a 2-bit adder 801. The summed value from the 2-bit adder 801 is summed with $PP_I[1:0]$ by a 2-bit adder 802. A 2-bit adder 803 sums $PP_I[1:0]$ with ACC_L_REG[1:0]. A multiplexer 804 selects the output of the adder 802 when the shift control signal SHIFT_ACC is a logic '0', but outputs the iterant partial product data $SPP_I[1:0]$ by selecting the output of the adder 803 when the shift control signal SHIFT_ACC is a logic '1'. As previously described, the iterant partial product data $SPP_I[1:0]$ may be supplied to the Montgomery recoder 110. There is no limit in size (or length) of bits in the exemplary embodiments of the present invention. For example, the iterant partial product data $SPP_I$ may be more than two bits, as may other elements of the embodiment.

Figure 23:
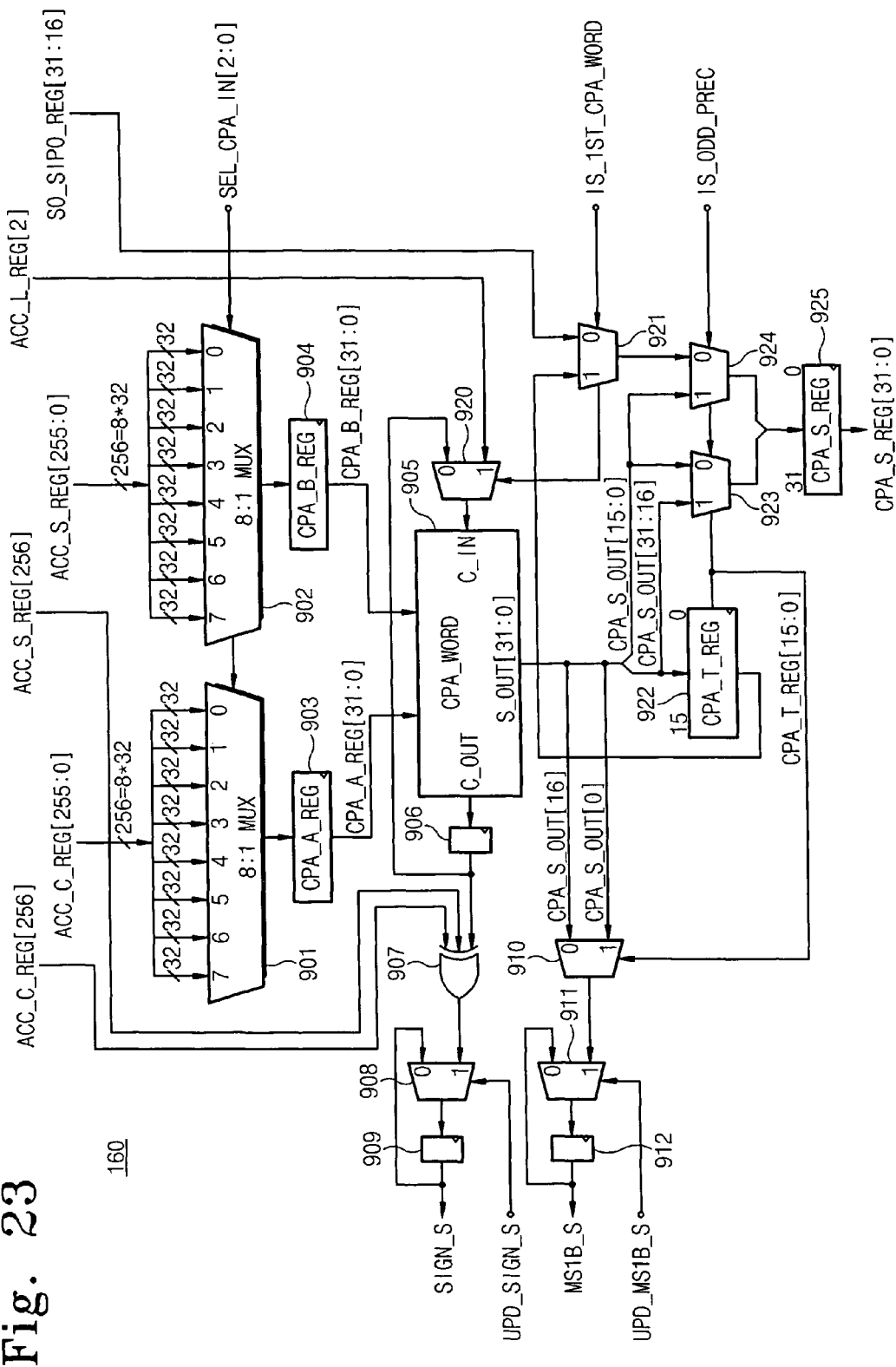
FIG. 23 illustrates a circuit configuration of a CPA operation block 160 in accordance with an exemplary embodiment of the present invention.

FIG. 23 illustrates a circuit configuration of a carry propagation adder (CPA) operation block 160 in accordance with an exemplary embodiment of the present invention. For this example, c=256 and w=32. In CPA operation block 160, CPA0, CPA1, CPA2 and CPA3, shown in FIG. 1, may be operated in sequence. A multiplexer 901 receives lower values ACC_C_REG[255:0], as a chunk length, among carry bits stored in a carry register 630 of the accumulator 150. A multiplexer 902 inputs a sum S[255:0] stored in a sum register 620 of the accumulator 150. The multiplexers 901 and 902 select 32 bits, in sequence, from the LSB among 256 input bits in response to an input selection signal SEL_CPA_IN[2:0]. Outputs from the multiplexers 901 and 902 may be stored in registers 903 and 904, respectively. The input selection signal SEL_CPA_IN[2:0] may vary from '0000' to '1111'. Thus, the CPA block 160 is able to process an operation for 256 bits by conducting eight iterative CPA cycles in units of 32 bits.

A carry propagation adder 905 adds a carry input C_IN of a multiplexer 920 to values CPA_A_REG[31:0] and CPA_B_REG[31:0] which are stored in the registers 903 and 904. After completing a carry save add (CSA) operation for each row, a resultant value of the accumulator 150 is ACC_S_REG[256:0]+ACC_C_REG[256:0]+ACC_L_REG[2], which is to be stored in the memory 40 after being converted into a single number via summing through the CPA operation. Therefore, the carry input C_IN in the first cycle (i.e., SEL_CPA_IN[2:0]='000') of the CPA operation is ACC_L_REG [2], while the other carry input C_IN in the remaining cycles (i.e., from SEL_SPA_IN[2:0]='001' to SEL_CPA_IN[2:0]= '111') is a carry output C_OUT of the previous operation cycle. The carry output C_OUT from the carry propagation adder 905 may be stored in a register 906.

A new sign bit SIGN_S for a resultant value of a row is obtained by performing an XOR operation with a carry output C_OUT (which is generated after adding the carry ACC_C_REG[255:0] to the sum ACC_S_REG[255:0] through the iterative operations in the CPA block 160) and with ACC_C_REG[256] and ACC_S_REG[256]. The sign bit SIGN_S may be changed to the newly calculated value under control of a signal UPD_SIGN_S. The control signal UPD_SIGN_S directs the second higher bit MS1B_S to be changed into the newly calculated value.

Figure 24:
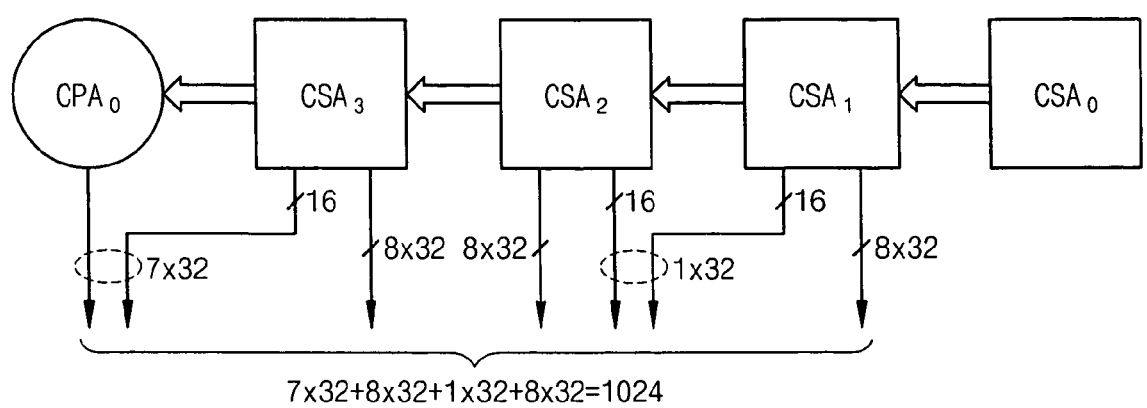
FIG. 24 illustrates a feature of maintaining a highest half word of a given word in the accumulator 150, while turning to a CPA operation from the last CSA operation of each row in an even-times multi-precision mode.

FIG. 24 illustrates a feature of maintaining a highest half word of a given word in the accumulator 150, while turning to a CPA operation from the last CSA operation of each row in an even-times multi-precision mode. In the case of an even-times multi-precision mode (i.e., a double precision mode or a quadruple precision mode), the last half-word (i.e., 16 bits when w=32) of output bits of the accumulator 150 is maintained in the register 180 and is not transferred to the memory 40, when it turns to the CPA operation step from the last CSA operation for each row. Such an effect is illustrated in FIG. 24. As shown in FIG. 24, the multiplier with the quadruple precision mode repeats the CSA unit operation cycle four times. A data length of each unit multiplying operation may defined by the following Equation 13 (where c=256 and w=32).

$$c' = c + w/2 = (c/w)^* w + w/2 = (256/32)^* 32 + 32/2 = 8^* 32 + 16 = 272 \quad \text{[Equation 13]}$$

An output of the last half-word (16 bits) by the second unit operation CSA1 combined or merged with the first half-word of the third unit operation CSA2 composes a full word. The full word is stored in the memory 40. Otherwise, an output of the last half-word by the fourth unit operation CSA3 remains in the register 180 and is not transferred to the memory 40, because there is no more unit operation block. In order to forcibly put the half-word data that is remaining in the register 180 into the memory 40 during the CPA operation, control signals IS_1ST_CPA_WORD and IS_ODD_PREC are used therein.

Returning to FIG. 23, in the even-times precision mode (IS_ODD_PREC='0'), the lower 16 bits, as a result output from the carry propagation adder 905 in the first cycle (IS_1ST_CPA_WORD='1') of the CPA operation, composes a full word (32 bits) with the higher 16 bits SO_SIPO_REG

[31:16] stored in the register 180. The full word is stored in the register 925. The higher 16 bits of a result output from the carry propagation adder 905 are stored in the register 922.

In the remaining cycles, the lower 16 bits among output bits from the carry propagation adder 905 are stored in the register 925, and are merged with the higher 16 bits that have been stored in the register 922 during the previous cycle. The data of the register 925 is thus stored in the memory 40 every cycle.

FIG. 25 is a truth table to illustrate an arrangement of logical formulas for given input/output signals of the Booth recoder 140. As discussed above regarding FIG. 14, the Booth recoder 140 may be constructed of combinational logic circuits. Logic formulas between input and output signals of the Booth recoder 140 may be configured as shown in FIG. 25.

In FIG. 25, A[1] and A[0] are the two LSBs of the multiplicand A used in a current unit multiplying operation. Thus, the two LSBs of −A are {A[1] xor A[0], A[0]}, and the two LSBs of +2A and −2A are {A[0], 0}.

When a compulsive partial product control signal FORCE_PP[1:0] is '11', the value of the partial product $PP_I$ is determined by the multiplier values B1, B0, and BR. Otherwise, when the compulsive partial product control signal FORCE_PP[1:0] is '01', '10', and '00', the partial product $PP_I$ is forced to be +A, −A, and 0, respectively.

In the initial value correction cycle of the accumulator 150 for each unit multiplying operation shown in FIG. 1, the resultant value SI of the previous row is 'stacked' in the accumulator. For this to happen, the partial product $PP_I$ is selected to '0' and the modulus product $MM_I$ is selected to the resultant value SI of the previous row. In the initial value correction cycle of the accumulator 150, the compulsive partial product selection signal FORCE_PP[1:0] is set to '11' in order to forcibly set the value of the partial product $PP_I$ on '0'.

With the Montgomery multiplier 10 according to the exemplary embodiments of the present invention, a result of modular exponentiation may be represented as a Montgomery residue number that is "XR mod M". But, the desired result is a normal residue number that is "X mod M". Accordingly, the compulsive partial product control signal FORCE_PP[1:0] may be used to transform the Montgomery residue number to the normal residue number. For example, it is possible to obtain the normal residue number by resuming the Montgomery multiplication by setting the multiplier B on '+1' and the multiplicand A on a resultant value of the Montgomery multiplication. To do this, the compulsive partial product control signal FORCE_PP[1:0] may be set on '01' only during the first cycle after the initial value correction cycle in each unit operation for the first row of the operation matrix, which renders the partial product $PP_I$ to be +A. In all remaining cycles, the compulsive partial product control signal FORCE_PP[1:0] is set on '11' to 'force' the partial product $PP_I$ to be 0.

The inputs B1, B0, and BR to the Booth recoder 140 are supplied from the multiplier register 106. Referring to FIG. 8C, the input A[1:0] may be a selected one from AX_PIPO_REG[1:0] or AY_PIPO_REG[1:0]. The input SEL_PP_D[1:0] is a delayed version of the selection signal SEL_PP; the delay is due to a latch FF1 of a delay circuit 141 (also referred to as a 'pipeline register' 141), as shown in FIG. 8B. The partial product enable signal EN_PP and the output SEL_PP[1:0] of the Booth recoder 140 are supplied to the partial product generator 130. The partial product inversion signal NEG_PP is supplied to the accumulator 150, and the partial product $PP_I[1:0]$ is output from the Booth recoder 140 to the SPP generator 170, as shown in FIG. 22.

FIG. 26 is a truth table to illustrate an arrangement of logical formulas for given input/output signals of the Montgomery recoder 110. The Montgomery recoder 110 may also be composed of combinational logic circuits. Exemplary logic formulas between new input and output signals of the Montgomery recoder 110 are shown in FIG. 26. In FIG. 26, a coding scheme for $q_I$ (QI[1:0] and QO[1:0]) may be summarized by the following Equation 14.

$$MM=0 \rightarrow q_I\text{"00"}$$

$$MM=+M \rightarrow q_I\text{"01"}$$

$$MM=-M \rightarrow q_I\text{"10"}$$

$$MM=+2M \rightarrow q_I\text{"11"} \quad \text{[Equation 14]}$$

In FIG. 26, M1 represents the second lower value of the modulus M. When the compulsive modulus product control signal FORCE_MM[1:0] is '11', the value of the modulus product $MM_I$ is determined by iterant partial product data SPP[1:0] and M1. But, the modulus product $MM_I$ may be forcibly selected to the resultant value SI of the previous row when the compulsive modulus product control signal FORCE_MM[1:0] is '10'. The modulus product $MM_I$ may be generated as a value selected by QI[1:0] when FORCE_MM[1:0] is '01'.

For all unit multiplying operations of the operation matrix, the value of the modulus product MMI is selected with the resultant value SI of the previous row in the initial value correction cycle of the accumulator 150. Since it is necessary to select the modulus product $MM_I$ that is adoptable to iterant partial product data SPP[1:0] and M1 in the first unit operation (i.e., Gen-Q Box) for each row of the operation matrix, the compulsive modulus product control signal FORCE_MM[1:0] is set to '00' in all remaining cycles save for the initial value correction cycle of the accumulator 150. During the initial value correction cycle, $q_I$ is calculated and then output as QO[1:0], to be stored in the memory 40 via register 116.

In the 'remaining' unit operations (i.e., Gen-S Box) except the first unit operation (i.e., Gen-Q Box) for each row of the operation matrix, the modulus product $MM_I$ is selected by reusing $q_I$ (i.e., the input QI[1:0]), which was stored in memory 40 during the first unit operation Gen-Q Box. The input QI[1:0] may be reused by setting the compulsive modulus product control signal FORCE_MM[1:0] on '01'.

The multiplier data path 100 according to an exemplary embodiment of the present invention is able to assist a normal multiplying operation in addition to the Montgomery multiplying operation. For the normal multiplying operation, the compulsive modulus product control signal FORCE_MM[1:0] may also be used therein. But, as a normal multiplication does not use a modulus, there is no modulus product $MM_I$. Therefore, the compulsive modulus product control signal FORCE_MM[1:0] is set to '10' only during the initial value correction cycle of the accumulator 150 for each unit operation, which sets the modulus product $MM_I$ to the resultant value SI of the previous row. During the remaining cycles, the compulsive modulus product control signal FORCE_MM[1:0] is set to '00' to force the modulus product $MM_I$ to be 0.

Referring now to FIG. 8A, the iterant partial product data SPP[1:0] input to the Montgomery recoder 110 is supplied from the SPP generator 170. M1 is used in the first unit operation (i.e., Gen-Q Box), and is selected among the second LSB of the modulus values M stored in the register 102 and the second LSB stored in the register 103. And, QI[1:0] is the two LSBs stored in the register 115. The input SEL_MM_D[1:0] is delayed from SEL_MM[1:0] through the flipflop 111 by one cycle. The output QO[1:0] of the Montgomery recoder recoder 110 is provided to the register 116. The modulus product selection signal SEL_MM[1:0] and the modulus product enable signal EN_MM are supplied to the multiple modulus generator 120. The modulus product inversion signal NEG_MM is supplied to the accumulator 150.

Referring to FIG. 8B, a glitch remover 114 may be provided to reduce power consumption thereof by removing glitches appearing at the output signals SEL_MM[1:0], EN_MM, and NEG_MM. The glitch remover 114 may be composed of latches or flipflops, and may be operable with a clock or an inversed clock used in another register or flipflop in the Montgomery multiplier 10. The use of a glitch remover 114 may be application specific. If an application requires a greater operating speed rather than reduced power consumption, it is possible to shorten a skew of a critical path by omitting the glitch remover 114 in the Montgomery multiplier 10.

The pipeline register 141 is provided to increase an operating frequency by means of 2-stage pipeline registers. The multiplier register 106 and the Booth recoder 140 may be operated earlier than the other blocks by one cycle. A control signal USE_X_REG may commonly control the following circuit components: the multiplexer 142 selecting the input signal A[1:0] for the Booth recoder 140, the multiple modulus generator 120, the partial product generator 130, the multiplexer 113 and flipflop 112 which select the signal M1 to be input to the Montgomery recoder 110. Here, due to the pipelining operation, only the multiplexer 142 selecting the input signal A[1:0] of the Booth recoder 140 directly uses the control signal USE_X_REG, while the other circuits 120, 130, 112 and 113 accept a signal delayed from the control signal USE_X_REG by one cycle, as shown in FIG. 8B.

As described above, the exemplary embodiments of the present invention may be able to provide a multi-precision multiplying operation using a scalable Montgomery multiplier. Moreover, the multiplier may be capable of performing a normal multiplying operation and a Montgomery multiplying operation. The exemplary Montgomery multiplier may be configured to transform a Montgomery residue number to a normal residue number by using the compulsive modulus product control signal FORCE_MM[1:0].

Although the present invention has been described in connection with the exemplary embodiments as illustrated by the accompanying drawings, it is not limited thereto. It will be apparent to those skilled in the art that various substitution, modifications and changes may be thereto without departing from the scope and spirit of the exemplary embodiments of the present invention.

What is claimed is:

1. A multiplier, comprising:
a modulus product generator selecting one n-bit number, from among n-bit modulus numbers −M, 0, M, and 2M and an n-bit number representing a previous row result SI, as a modulus product;
a partial product generator selecting one multiplicand number, from among multiplicand numbers −2A, −A, 0, +A and +2A, as a partial product; and
an accumulator stacking the selected modulus product and partial product;
wherein the previous row result SI represents a result of multiplication in a previous row of the accumulator.

2. The multiplier of claim 1, wherein
M is formed from a currently input extended chunk of bits among the n-bit modulus numbers, and
A is formed from a currently input extended chunk of bits among n-bit multiplicand numbers.

3. The multiplier of claim 2, wherein the previous row result SI is formed from bits corresponding to the currently input extended chunks of the multiplicand and modulus number among multiplied results of the previous row of the accumulator.

4. The multiplier of claim 2, wherein the modulus product generator selects the previous row result SI as the modulus product in an initial value correction cycle of the accumulator.

5. The multiplier of claim 4, wherein the partial product generator sets the partial product on '0' in the initial value correction cycle of the accumulator.

6. The multiplier of claim 5, wherein the initial value correction cycle represents a first cycle of a unit multiplying operation using the currently input extended chunk bits of the n-bit multiplicand and n-bit modulus numbers.

7. The multiplier of claim 4, wherein the initial value correction cycle represents a first cycle of a unit multiplying operation using the currently input extended chunk bits of the n-bit multiplicand and n-bit modulus numbers.

8. The multiplier of claim 2, further comprising:
a modulus register storing currently input bits of the n-bit modulus number (M);
a multiplicand register storing currently input bits of the n-bit multiplicand (A); and
a multiplier register storing currently input bits of an n-bit multiplier number (B).

9. The multiplier of claim 8, wherein
the modulus register and the multiplicand register are each embodied as c'+1 bit registers, and
c' is a positive integer that represents an extended chunk bit length of at least one of the n-bit multiplicand and n-bit modulus numbers, c' being less than or equal to n.

10. The multiplier of claim 8, wherein the modulus register further includes a plurality of sub-registers each sized in a half-word, and a 1-bit sign register.

11. The multiplier of claim 10, further comprising a memory interface block for storing word-length data, wherein
the plurality of sub-registers of the modulus register include even-numbered sub-registers and odd-numbered sub-registers,
the even-numbered sub-registers are configured to store lower-significance half-words of the word-length data supplied from the memory interface block, and
the odd-numbered sub-registers are configured to store higher-significance half-words of word-length data supplied from the memory interface block.

12. The multiplier of claim 8, wherein the multiplicand register further includes a plurality of sub-registers each sized in a half-word, and a 1-bit sign register.

13. The multiplier of claim 12, further comprising a memory interface block for storing word-length data, wherein
the plurality of sub-registers of the multiplicand register include even-numbered sub-registers and odd-numbered sub-registers,
the even-numbered sub-registers are configured to store lower-significance half-words of the word-length data supplied from the memory interface block, and
the odd-numbered sub-registers are configured to store higher-significance half-words of word-length data supplied from the memory interface block.

14. The multiplier of claim 8, further comprising:
a shift register storing the input bits of the n-bit multiplier number as a word length (w) that is equal to or less than a chunk length (c), $w \leq c \leq n$, and shifting data by two bits.

15. The multiplier of claim 14, wherein the partial product selector generates a partial product selection signal from three bits (B0, B1, BR) of the currently input bits of the n-bit multiplier number, and selects one of the input bits A, 2A, −A and −2A of the n-bit multiplicand number as the partial product.

16. The multiplier of claim 15, wherein the 2A multiplicand number is obtained by shifting the A multiplicand number.

17. The multiplier of claim 15, wherein the −A multiplicand number is obtained by inverting the A multiplicand number.

18. The multiplier of claim 15, wherein the −2A multiplicand number is obtained by inverting and shifting the A multiplicand number.

19. The multiplier of claim 1, wherein the −M modulus number is obtained by inverting the modulus number M.

20. The multiplier of claim 1, wherein the 2M modulus number is obtained by shifting the modulus number M.

21. An operation unit, comprising:
a memory;
a host storing a multiplicand A, a multiplier B and a modulus number M in the memory; and
the multiplier of claim 1 performing a Montgomery multiplying operation with the stored multiplicand, multiplier and modulus number under control of the host, and storing an operation result from the Montgomery multiplying operation in the memory.

22. The operation unit of claim 21, wherein
M is formed from a currently input extended chunk of bits among the n-bit modulus numbers,
A is formed from a currently input extended chunk of bits among n-bit multiplicand numbers, and
the previous row result SI is formed from bits corresponding to the currently input extended chunks of the multiplicand and modulus number among multiplied results of the previous row of the accumulator.

23. The operation unit of claim 21, wherein
the modulus product selector reads the previous row result SI and part of the n-bit modulus number from the memory to select one of SI, −M, 0, M and 2M as the modulus product, and
the partial product selector reads a part of the n-bit multiplicand number to select one of −2A, −A, 0, +A and +2A as the partial product, the selected modulus and partial products being stacked by the accumulator.

24. The operation unit of claim 21, wherein the multiplier iteratively performs the Montgomery multiplying operation until the multiplicand, multiplier and modulus are read out from the memory.

25. The operation unit of claim 21, wherein
each of the multiplicand, multiplier and modulus number is n bits, and
the multiplier processes the read out multiplicand, multiplier and modulus numbers by c' bits every cycle of a unit multiplying operation, where c' represents the bit length of an extended chunk of bits of the multiplicand, multiplier and modulus numbers.

26. The operation unit of claim 25, wherein the multiplier reads the multiplier from the memory as a block of w bits stored in a register that is sized in length of the w-bit, w representing a word length,
processes the multiplier stored in the w-bit register by d bits in sequence, d representing a digit length of a radix, and reads the next w bits of the multiplier from the memory after processing the w bits stored in the w-bit register.

27. The operation unit of claim 26, wherein the multiplier further includes a controller generating a compulsive partial product control signal.

28. The operation unit of claim 27, wherein the partial product selector generates a partial product selection signal and a partial product enable signal from three bits (B0, B1, BR) of the currently input bits of the multiplier when the compulsive partial product control signal has a first value, and selects one of A, 2A, −A, −2A and 0 as the partial product based on the input bits of the multiplicand (A).

29. The operation unit of 27, wherein the partial product selector selects the multiplicand (A) as the partial product so as to obtain a normal residue number when the compulsive partial product control signal has a second value.

30. The operation unit of claim 29, wherein the partial product selector selects the −A as the partial product with reference to the multiplicand (A) when the compulsive partial product control signal has a third value.

31. The operation unit of claim 30, wherein the compulsive partial product control signal has a fourth value in an initial value correction cycle of the accumulator.

32. The operation unit of claim 30, wherein the partial product selector selects 0 as the partial product when the compulsive partial product control signal has the fourth value.

33. The operation unit of claim 27, wherein the partial product selector selects the −A as the partial product with reference to the multiplicand (A) when the compulsive partial product control signal has a third value.

34. The operation unit of claim 27, wherein the compulsive partial product control signal has a fourth value in the initial value correction cycle of the accumulator, and the partial product selector selects 0 as the partial product when the compulsive partial product control signal has the fourth value.

35. The operation unit of claim 27, wherein the multiplier generates iterant partial product data $SPP_I$ in response to carry values, sum values and lower values stored in the accumulator, the partial product, and a shift control signal for a feedback input of the accumulator.

36. The operation unit of claim 35, wherein the controller further generates a compulsive modulus product control signal.

37. The operation unit of claim 36, wherein the modulus product selector generates a modulus product selection signal to select one of −M, 0, M and 2M from the iterant data $SPP_I$ and a second lower value of the modulus (M) when the compulsive modulus product control signal has a first value.

38. The operation unit of claim 36, wherein the compulsive modulus product control signal has a second value in the initial value correction cycle of the accumulator.

39. The operation unit of claim 38, wherein the modulus product selector selects the previous row result SI as the modulus product when the compulsive modulus product control signal has the second value.

40. The operation unit of claim 39, wherein the modulus product selection signal is generated with reference to a value QI when the compulsive modulus product control signal has a third value.

41. The operation unit of claim 40, wherein the compulsive modulus product control signal has a fourth value in the rest cycles except the initial value correction cycle.

42. The operation unit of claim 41, wherein the modulus product selector selects the multiplicand (A) as the partial product so as to obtain a normal residue number when the compulsive partial product control signal has the second value.

43. The operation unit of claim 26, wherein each of the multiplicand, multiplier and modulus numbers is c' bits for the unit multiplying operation, the unit multiplying operation being carried out $(n/c)* (n/c)$ times for all operation cycles.

44. The operation unit of claim 43, wherein the multiplier iteratively reads the n-bit multiplicand and modulus numbers from the memory on a w-bits basis,
stores the w bits in a c'-bit register sized in length of c' bits, and
processes the c' bits of the c'-bit register as a whole.

45. The operation unit of claim 44, wherein a first operation cycle of each unit multiplying operation represents an initial value correction cycle of the accumulator.

46. The operation unit of claim 45, wherein the modulus product selector selects the previous row result SI as the modulus product in the initial value correction cycle of the accumulator.

47. The operation unit of claim 46, wherein the partial product selector sets the partial product on '0' in the initial value correction cycle of the accumulator.

48. The operation unit of claim 44, further comprising:
a modulus register storing bits with a currently input extended chunk length (c') of the modulus (M);
a multiplicand register storing bits with a currently input extended chunk length (c') of the multiplicand (A); and
a multiplier register storing bits with a currently input word length (w) of the multiplier (B).

49. The operation unit of claim 48, wherein
the modulus register and the multiplicand register are each embodied as c'+1 bit registers, and
c' is a positive integer that represents an extended chunk bit length of at least one of the n-bit multiplicand and n-bit modulus numbers, c' being less than or equal to n.

50. The operation unit of claim 48, wherein each of the modulus register and the multiplicand register further include a plurality of sub-registers and a 1-bit sign register selectively loading a new value in response to one of a clock signal and a loading enable signal.

51. The operation unit of claim 48, wherein
the multiplier register is a register having a bit length of w, representing a word length, and
the multiplier register shifts data to the right or loads a new value in response to a one of a clock and a control signal.

52. An operation unit, comprising:
a multiplier sequentially performing unit multiplying operations (n/c)* (n/c) times for:
an n-bit multiplicand number composed of n/c chunks of bits;
an n-bit multiplier number composed of n/c chunks of bits;
an n-bit modulus number composed of n/c chunks of bits;
extended chunks of bits of the n-bit multiplier number; and
extended chunks of bits of the n-bit modulus number;
wherein n>c,
wherein n and c are positive integers,
wherein the multiplier comprises:
a modulus product generator selecting one of n-bit modulus numbers −M, 0, M, 2M and a previous row result SI as a modulus product;
a partial product generator selecting a multiplicand number from one of −2A, −A, 0, +A and +2A multiplicand numbers as a partial product; and
an accumulator stacking the selected modulus product and partial product;
wherein M is a currently input extended chunk of c' bits (c'=c+k) among the n-bit modulus numbers, k being an integer, and
wherein A is a currently input extended chunk of c' bits among the n-bit multiplicand numbers.

53. The operation unit of claim 52, wherein the previous row result SI is a result of multiplication of bits corresponding to the currently input extended chunks of the multiplicand and modulus number among multiplied results of the previous row of the accumulator.

54. The operation unit of claim 52, wherein
the multiplier performs unit multiplying operations for a plurality of rows to generate multiplication results at the end of each row, and
multiplication results for all rows but the last row have a bit length of n+2 bits.

55. The operation unit of claim 54, wherein a multiplication result for the last row has a bit length of n+1 bits.

56. The operation unit of claim 52, wherein n represents a bit length of an operand comprising one or more of the multiplicand, multiplier, and modulus number.

57. The operation unit of claim 56, wherein c denotes a bit length of the chunk, n being an integer multiple of c.

58. The operation unit of claim 57, wherein c' represents a bit length of the extended chunk, c'=c+k, k being an integer.

59. The operation unit of claim 58, wherein a data path in the multiplier is sized in proportion to c'.

* * * * *